(12) United States Patent
Grimm

(10) Patent No.: US 11,820,503 B2
(45) Date of Patent: Nov. 21, 2023

(54) AIRCRAFT HAVING A FOLDING SYSTEM

(71) Applicant: Friedrich Grimm, Stuttgart (DE)

(72) Inventor: Friedrich Grimm, Stuttgart (DE)

( * ) Notice: Subject to any disclaimer, the term of this patent is extended or adjusted under 35 U.S.C. 154(b) by 101 days.

(21) Appl. No.: 17/614,065

(22) PCT Filed: May 20, 2020

(86) PCT No.: PCT/EP2020/064201
§ 371 (c)(1),
(2) Date: Nov. 24, 2021

(87) PCT Pub. No.: WO2020/239604
PCT Pub. Date: Dec. 3, 2020

(65) Prior Publication Data
US 2022/0227477 A1    Jul. 21, 2022

(30) Foreign Application Priority Data

May 24, 2019    (DE) .................... 10 2019 003 739.1

(51) Int. Cl.
*B64C 3/56*    (2006.01)
*B60F 5/02*    (2006.01)
*B64C 39/06*    (2006.01)

(52) U.S. Cl.
CPC ................ *B64C 3/56* (2013.01); *B60F 5/02* (2013.01); *B64C 39/068* (2013.01)

(58) Field of Classification Search
CPC ......... B64C 3/56; B64C 39/068; B64C 25/54; B60F 5/02
See application file for complete search history.

(56) References Cited

U.S. PATENT DOCUMENTS

| 621,195 A | 3/1899 | Zeppelin |
|---|---|---|
| 2,550,278 A | 4/1951 | Makhonine |
| 4,053,125 A | 10/1977 | Ratony |

(Continued)

FOREIGN PATENT DOCUMENTS

| DE | 29 01 115 A1 | 7/1980 |
|---|---|---|
| DE | 40 14 933 A1 | 11/1991 |

(Continued)

OTHER PUBLICATIONS

WIPO, International Preliminary Report on Patentability, PCT/EP2020/064201, dated Dec. 2, 2021.

*Primary Examiner* — Rodney A Bonnette
(74) *Attorney, Agent, or Firm* — FRESH IP PLC

(57) ABSTRACT

An aircraft has an empennage and a folding system. The folding system has aerofoils and node bodies which are connected to one another. The aerofoils have at least two nose-side aerofoils and at least two tail-side aerofoils, of which one of the nose-side aerofoils and one of the tail-side aerofoils are port-side aerofoils and one of the nose-side aerofoils and one of the tail-side aerofoils are starboard-side aerofoils. The node bodies have fuselage-side node bodies and outer node bodies. The nose-side aerofoils and tail-side aerofoils are each articulated at a first end to an associated fuselage-side node body, and the nose-side aerofoils and tail-side aerofoils are each articulated at a second end to an outer node body. The tail-side node bodies are displaceable at least partially along an associated translation axis. The folding system functions as the empennage during flight.

21 Claims, 16 Drawing Sheets

(56) References Cited

U.S. PATENT DOCUMENTS

Figure 1:
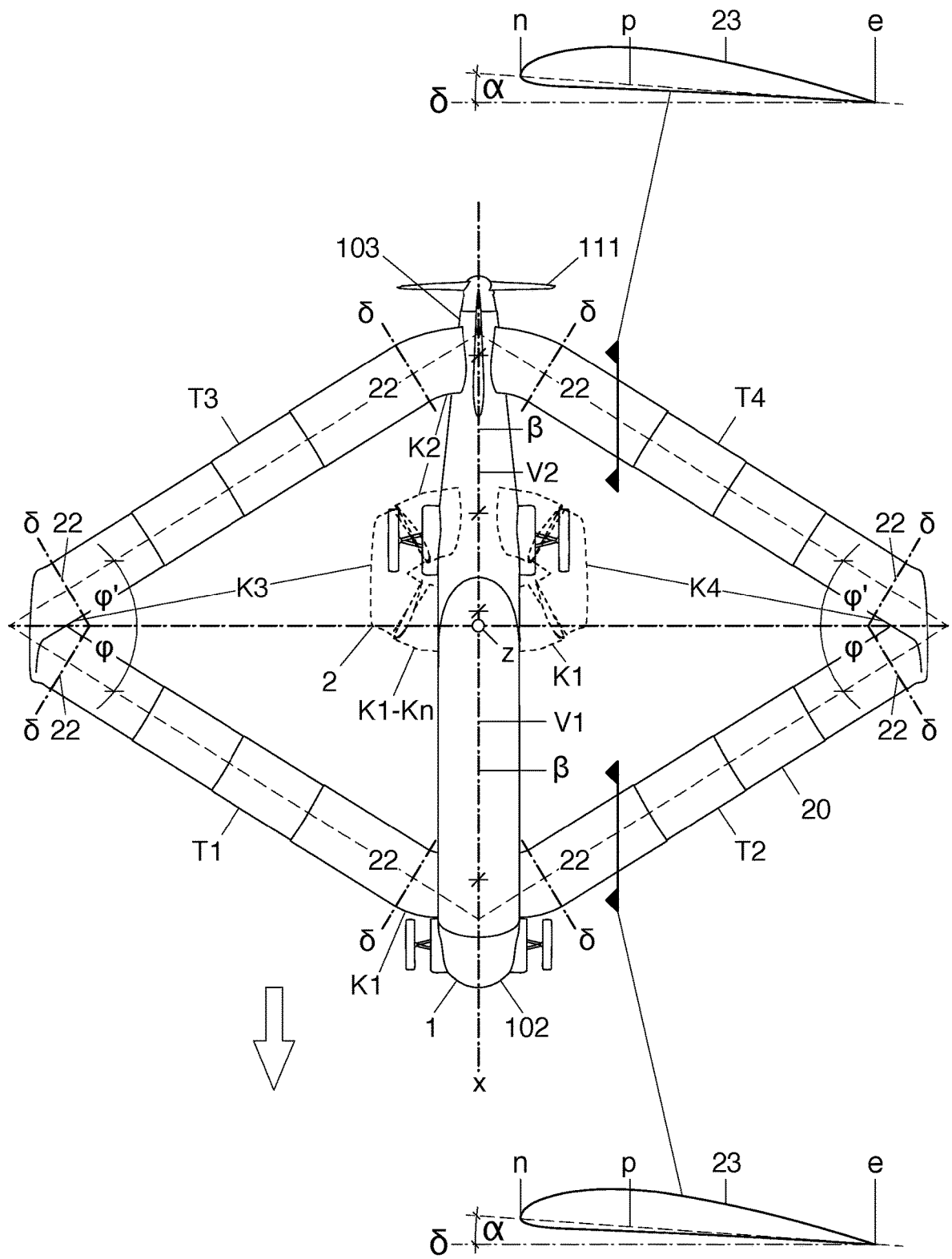

| | | | |
|---|---|---|---|
| 4,365,773 | A | 12/1982 | Wolkovitch |
| 5,671,899 | A | 9/1997 | Nicholas |
| 5,899,410 | A | 5/1999 | Garrett |
| 6,474,604 | B1 | 11/2002 | Carlow |
| 7,866,610 | B2 | 1/2011 | Bousfield |
| 2004/0217230 | A1 | 11/2004 | Fannucci et al. |
| 2005/0230531 | A1* | 10/2005 | Horinouchi ............... B64C 3/10 244/47 |
| 2010/0282917 | A1 | 11/2010 | O'Shea |
| 2010/0314498 | A1 | 12/2010 | Im |
| 2011/0226174 | A1 | 9/2011 | Parks |
| 2012/0085858 | A1 | 4/2012 | Seifert |
| 2017/0106977 | A1 | 4/2017 | Hubschwerlen |
| 2018/0002001 | A1* | 1/2018 | Daniel, Sr. .............. B64C 27/08 |
| 2019/0382115 | A1 | 12/2019 | Varigas |

FOREIGN PATENT DOCUMENTS

| | | |
|---|---|---|
| DE | 10 2010 048 139 A1 | 4/2012 |
| EP | 0 313 925 B1 | 10/1992 |
| EP | 2 105 378 B1 | 5/2012 |
| EP | 3 299 280 A1 | 3/2018 |
| WO | WO2004/074 093 A1 | 9/2004 |
| WO | WO2008/ 010 226 A1 | 1/2008 |
| WO | WO2018/158549 A1 | 9/2018 |

\* cited by examiner

AIRCRAFT HAVING A FOLDING SYSTEM

The invention relates to an aircraft having a folding system.

U.S. Pat. No. 621,195 dated 14 Mar. 1899 describes the airship invented by Count Ferdinand Zeppelin. In a variant of the airship, a kinematic articulated chain formed by a plurality of airship bodies arranged one behind the other is described.

U.S. Pat. No. 2,550,278 discloses a telescopic wing for aircraft invented by Jean Makhonine.

U.S. Pat. No. 7 866 610 B2 discloses a telescopic wing made up of a plurality of aerofoil segments.

EP 2 105 378 B1 discloses a helicopter with aerofoils on the nose and tail sides, each of which has a positive sweep.

US 2011/0226174 A1 discloses a drone with four wings that can be placed on the fuselage of the drone in a space-saving manner.

DE 40 14 933 A1 discloses a foldable ultralight aircraft that has a delta-shaped foldable frame and a pneumatically stabilized wing surface.

DE 29 01 115 A1 discloses a helicopter in which the aerofoils with rotors arranged thereon are attached to the upper part of the cabin and can be pivoted with respect to the cabin.

EP 3 299 280 A1 discloses a helicopter with foldable rotors and an aerofoil that can be pivoted about the vertical axis.

EP 0 313 925 B1 discloses a folding system formed by nodes and rods in which the rods are articulated at their ends to an even number of nodes by means of revolute joints. In an unfolded position, the folding system can roll on wheels.

U.S. Pat. No. 4,053,125 discloses an aircraft with front and rear wings, which can, on the outside, be moved with respect to one another via a perpendicular axis.

It is therefore an object of the invention to provide a new aircraft.

This object is achieved by the subject matter of claim 1.

An aircraft has at least one fuselage, an engine, a landing gear, a longitudinal axis, a transverse axis and a vertical axis as well as a folding system. The folding system has aerofoils and node bodies which are connected to one another. The aerofoils have at least two nose-side aerofoils with a positive sweep angle and at least two tail-side aerofoils with a negative sweep angle in relation to the transverse axis, of which one of the nose-side aerofoils and one of the tail-side aerofoils are port-side aerofoils, and one of the nose-side aerofoils and one of the tail-side aerofoils are starboard-side aerofoils. The node bodies have fuselage-side node bodies and outer node bodies. The nose-side aerofoils and tail-side aerofoils each have a first end and a second end. The nose-side aerofoils and tail-side aerofoils are each articulated at the first end to an associated fuselage-side node body by means of a revolute joint with a rotation axis, and the nose-side aerofoils and tail-side aerofoils are each articulated at the second end to an outer body by means of a revolute joint with a rotation axis. A nose-side aerofoil and a tail-side aerofoil are connected to each other in each case via one of the outer node bodies. The tail-side node bodies are displaceable at least partially along an associated translation axis. With respect to the outer node bodies, the rotation axis associated with the nose-side aerofoil is not provided parallel to the rotation axis associated with the tail-side aerofoil in order to allow for a movement of the associated outer node body with a movement component in the direction of the vertical axis and thus different operating positions of the folding system by means of a displacement of a fuselage-side node body along the associated translation axis and the fuselage-side node bodies of the nose-side aerofoils, or the fuselage-side node bodies of the tail-side aerofoils, or both the fuselage-side node bodies of the nose-side aerofoils and the tail-side aerofoils can be moved independently of one another along the associated translation axis, and the folding system has the function of the empennage during flight.

At both ends, the aerofoils are articulated to the node bodies at both ends by means of revolute joints with rotation axes in such a way that, due to the displacement of at least one of the node bodies of the folding system along an associated translation axis, all further node bodies and all aerofoils are transformed in an inevitable folding movement that is predetermined by the degree of freedom of the revolute joints. This folding movement can be used, for example, for a trimming process, but all the functions of a horizontal stabilizer, vertical stabilizer and wing flaps can be realized as well. Due to the structure of the folding system with the connection of the aerofoils through the outer node bodies, any vortex shedding at the ends of the aerofoils is reduced or does not occur at all. This leads to an aerodynamic advantage. Such a folded structure has novel stability properties under dynamic stress. The aerofoils can be adjusted with little effort by moving the fuselage-side node bodies to achieve the desired flight. In addition, the air resistance when adjusting the aerofoils is lower than, for example, when extending control flaps. For the driving and stationary mode of the aircraft according to the invention, the dimensions can be changed with a corresponding design of the folding system in such a way that the aircraft can be made compatible with road or rail traffic.

In flight, the folding system is preferably unfolded and can be adapted to the different flight phases by controlled folding movements so that the functions of an empennage and the functions of slats and wing flaps on the aerofoils can be at least partially replaced by the folding system. For the driving and stationary mode, the aircraft can be folded in the simplest possible way so that, for example, a commercial aircraft can directly navigate to a terminal for passengers to get on or off.

By displacing at least one of the fuselage-side node bodies along an associated translation axis, the assigned outer node bodies and the aerofoils on the assigned port side or starboard side are in an inevitable and reversible folding movement that is predetermined by the degree of freedom of the revolute joints, in different operating positions provided for the flight, driving or stationary modes of the aircraft.

If the distance between two fuselage-side node bodies of the folding system is changed on a fuselage side, not only do the distances between all other node bodies of the folding system on this fuselage side change but also the angle of attacks of the aerofoils with a positive and a negative sweep angle each in opposite directions. This property of the folding system is used to adapt the aircraft to the different aerodynamic requirements of the flight mode, the folding system at least partially taking over the functions of an empennage and preferably the function of slats and wing flaps during take-off and landing.

According to a preferred embodiment, the aircraft has a locking device for locking the fuselage-side node bodies relative to the fuselage in order to thereby lock the aerofoils in a predetermined operating position. The locking device can, for example, use electric motors, hydraulics or pneumatics.

According to a preferred embodiment, the translation axis of at least one fuselage-side node body runs parallel to the longitudinal axis of the aircraft. This results in a well-defined transformation of the folding system.

According to a preferred embodiment, the aerofoils are twisted, and each have an asymmetrical wing profile with a suction side, with a pressure side and with a profile chord extending from a wing nose to a wing trailing edge in a cross section parallel to the longitudinal axis.

According to a preferred embodiment, the wing noses each have adjustable slats, and the wing trailing edges have adjustable wing flaps.

According to a preferred embodiment, at least one of the aerofoils has a telescopic wing which is made up of at least two aerofoil segments. The aerofoil segments can be pushed into one another in at least one predetermined operating position in such a way that the length of one aerofoil is reduced. This allows for a space-saving placement, for example, at an airport. A telescopic wing is preferably comprised of at least two aerofoil segments which, when the telescopic wings are aligned parallel to the vertical axis in the maximally or mostly folded position of the folding system, can be pushed into one another in such a way that the length of an aerofoil is decreased, and the folding system forms compact bundles of the aerofoils and the node bodies. Preferably, at least one aerofoil segment of the telescopic wing may have adjustable slats and wing flaps.

According to a preferred embodiment, the fuselage has a tube which extends between a nose and a tail, the tube preferably having a cross section from the first group of cross sections consisting of a cross section that is circular, oval, polygonal and freely shaped according to aerodynamic and functional aspects.

According to a preferred embodiment, the fuselage-side node bodies have nose-side and tail-side fuselage-side node bodies. Their aerofoils have a nose-side port-side aerofoil, a nose-side starboard-side aerofoil, a tail-side port-side aerofoil and a tail-side starboard-side aerofoil. On the aircraft, the nose-side starboard-side aerofoil and the nose-side port-side aerofoil are each connected to one of the nose-side fuselage-side node bodies, and the tail-side port-side aerofoil and the tail-side starboard-side aerofoil are each connected to one of the tail-side fuselage-side node bodies.

According to a preferred embodiment, the outer node bodies are each designed as winglets. Winglets lead to an advantageous, energy-saving flight behavior.

According to a preferred embodiment, the landing gear is formed by a landing gear that can be retracted into the fuselage with a main undercarriage and a nose-side support undercarriage or in which the undercarriage has four wheels articulated to the fuselage, which can be placed against the fuselage in flight.

According to a preferred embodiment, the first and second starboard-side aerofoils are arranged at a vertical distance from one another with respect to the vertical axis, and the first and second port-side aerofoils are arranged at a vertical distance from one another with respect to the vertical axis.

According to a preferred embodiment, the aircraft has nose-side fuselage-side node bodies and tail-side fuselage-side node bodies. The nose-side fuselage-side node bodies are connected to the underside of the fuselage, and the tail-side node bodies are connected to the top of the fuselage. This allows for a comparatively large difference in height between the nose-side and tail-side aerofoils.

According to a preferred embodiment, at least one of the fuselage-side node bodies is connected to the fuselage as a slide via a rail. Such a connection results in a well-defined movement.

According to a preferred embodiment, the aerofoils are folded during the driving and stationary modes and unfolded in the operating position intended for the flight mode.

The folding results in a compact structure, and when unfolded, the aerofoils can be used for the flight mode.

According to a preferred embodiment, the folding system has a quadrangle which is arranged mirror-symmetrically to the longitudinal axis and is designed as a square, a rhombus or a deltoid.

According to a preferred embodiment, the revolute joints each have only one degree of freedom, and the fuselage-side node bodies are connected to the fuselage at least in the unfolded operating position intended for the flight mode. The folding system, together with the fuselage, preferably forms a structure with a defined elastic deformability. The connection with the fuselage stabilizes the folded structure and allows for greater forces.

In order to ensure the mobility of the revolute joints during the flight mode even if the aerofoils are twisted, rolling bearings with rolling elements in the form of balls, rollers or cones are preferably provided between the mutually complementary projections and recesses of the aerofoils and the node bodies.

According to a preferred embodiment, the fuselage-side node bodies have a fixed distance from one another with respect to the longitudinal axis in a basic position provided for a straight flight path, and the profile chords of the aerofoils have a predetermined angle of attack.

According to a preferred embodiment, the aircraft is designed to fulfill the function of the empennage in that at least one fuselage-side node body of the port-side aerofoils and at least one fuselage-side node body of the starboard-side aerofoils is displaced on the associated translation axis in order to initiate a rotational movement of the aircraft about the transverse axis so that the distance between the fuselage-side node bodies is either decreased or increased, and the angles of attack of the two nose-side aerofoils change in opposite directions relative to the two tail-side aerofoils.

According to a preferred embodiment, the aircraft is designed to fulfill the function of the empennage in that, for the initiation of a rotational movement of the aircraft about the longitudinal axis and about the vertical axis, the fuselage-side node bodies associated with the nose-side aerofoils, or the fuselage-side node bodies associated with the tail-side aerofoils, or both the fuselage-side node bodies associated with the nose-side aerofoils and the fuselage-side node bodies associated with the tail-side aerofoils are displaceable independently of one another along the associated translation axes so that, in order to make a turn, the angle of attack of the starboard-side aerofoil and the port-side aerofoil can be changed independently of one another. Such an independent change can produce a desired rotary movement.

According to a preferred embodiment, the aircraft is designed as a supersonic aircraft in which the tail-side aerofoils have adjustable wing flaps on the wing trailing edges, in which the fuselage has a tube with an adjustable fuselage and with a raised tail, in which the fuselage-side node bodies of the tail-side aerofoil are rigidly connected to the fuselage, in which the fuselage-side node bodies of the nose-side aerofoils can each be displaced on an associated rail along a translation axis on the underside of the tube within an adjustment region in such a way that, in an operating position of the folding system intended for subsonic flight, the distance between the node bodies is increased so much that the chord of the asymmetrical wing profile has an angle of attack on the two nose-side aerofoils, and the wing flaps are lowered at the two fail-side aerofoils so that all four aerofoils have curved suction sides with a pressure point in the front third for the subsonic flight and that, in an operating position of the folding system intended for supersonic flight, the distance between the node bodies is selected so that the aerofoils assume a V-shaped position with respect to the vertical axis, and the aerofoils have a suction side with a pressure point that is displaced to the rear relative to the operating position for subsonic flight. Such an aircraft has positive flight characteristics both in supersonic flight and in subsonic flight. For supersonic flight, for example, a wing position is provided on such an aircraft in which the profile chords of the aerofoils are aligned parallel to the longitudinal axis of the aircraft, the two nose-side aerofoils are made from one piece, and the two tail-side aerofoils are made from two parts with a wing flap. Shifting the pressure point to the rear for supersonic flight is called rear-loading.

According to a preferred embodiment, an angle of attack is provided between the rotation axis of a fuselage-side revolute joint of the folding structure and the profile chord of an aerofoil, which tapers towards the outer end of an aerofoil, so that an aerofoil is twisted.

According to a preferred embodiment, the revolute joint with the rotation axis between one of the node bodies and an aerofoil is designed as a multi-sectional connection. Multi-sectional connections can be made very stable.

In order to ensure the mobility of the revolute joints during the flight mode even if the aerofoils are twisted, rolling bearings with rolling elements in the form of balls, rollers or cones are preferably provided between the mutually complementary projections and recesses of the aerofoils and the node bodies.

According to a preferred embodiment, the fuselage has longitudinal and transverse ribs and a planking, and the fuselage-side node bodies are connected to at least one of the longitudinal ribs. This results in a stable connection.

According to a preferred embodiment, the fuselage is designed as a polygonal truss tube with a rectangular cross-section. The truss tubes have cord bars designed as longitudinal ribs, with the chord bars forming a rail for the displacement of the fuselage-side node bodies. The truss tube design provides for a very stable construction.

According to a preferred embodiment, a systematic separation of the support and the shell function of the fuselage is provided, with the wing unit being formed by a truss tube and the shell by a covering or by panels. This separation allows for a stable wing unit and a comparatively thin and light shell.

According to a preferred embodiment, the aircraft is designed as a drone, which is designed as an autonomously flying air taxi, as a cargo aircraft with a tail-side or nose-side loading flap or as a fire-fighting aircraft.

According to a preferred embodiment, the fuselage is designed as a tube and forms a non-displaceable abutment for the displacement and for the locking of the fuselage-side node bodies in the respective operating position, wherein, preferably, the displacement and locking of at least one of the abutment-side node bodies is performed mechanically or hydraulically or pneumatically or by means a pretensioned spring or a combination of two or more of the systems mentioned.

According to a preferred embodiment, the aerofoils of the aircraft have a positive V-position, and the aircraft is designed to
   initiate the descent by shortening the distance between the fuselage-side node bodies of the nose-side aerofoils and the fuselage-side node bodies of the tail-side aerofoils,
   initiate the climb by lengthening the distance between the fuselage-side node bodies of the nose-side aerofoils and the fuselage-side node bodies of the tail-side aerofoils and
   initiate a turn by moving the fuselage-side node bodies of the nose-side aerofoils or the fuselage-side node bodies of the tail-side aerofoils independently of one another. The fuselage-side node bodies are therefore not rigidly connected to one another on the starboard side and the port side but rather can be moved differently or relative to one another due to the independence from one another. This makes it possible for the folded structure to influence the flight in an asymmetrical manner.

According to a preferred embodiment, the aerofoils of the aircraft have a negative V-position, and the aircraft is designed to
   initiate the climb by shortening the distance between the fuselage-side node bodies of the nose-side aerofoils and the fuselage-side node bodies of the tail-side aerofoils,
   initiate the descent by lengthening the distance between the fuselage-side node bodies of the nose-side aerofoils and the fuselage-side node bodies of the tail-side aerofoils and
   initiate a turn by moving the fuselage-side node bodies of the nose-side aerofoils or the fuselage-side node bodies of the tail-side aerofoils independently of one another.

According to a preferred embodiment, the aircraft is designed as a seaplane, and the landing gear has floating bodies, with the fuselage forming a central floating body and the outer node bodies being connected to supporting floating bodies, with the aerofoils of the aircraft being designed to have a negative V-position.

According to a preferred embodiment, the aircraft is designed as a solar aircraft.

According to a preferred embodiment, the aerofoils are straight, i.e., they are straight in the plan view.

According to a preferred embodiment, the diagonally overflowed airfoils of the folding system, following the change of the sweep angle, are formed alternately, concavely and convexly curved in the sense of an uninterrupted flow.

The preferred embodiments can be combined with one another.

Figure 2:
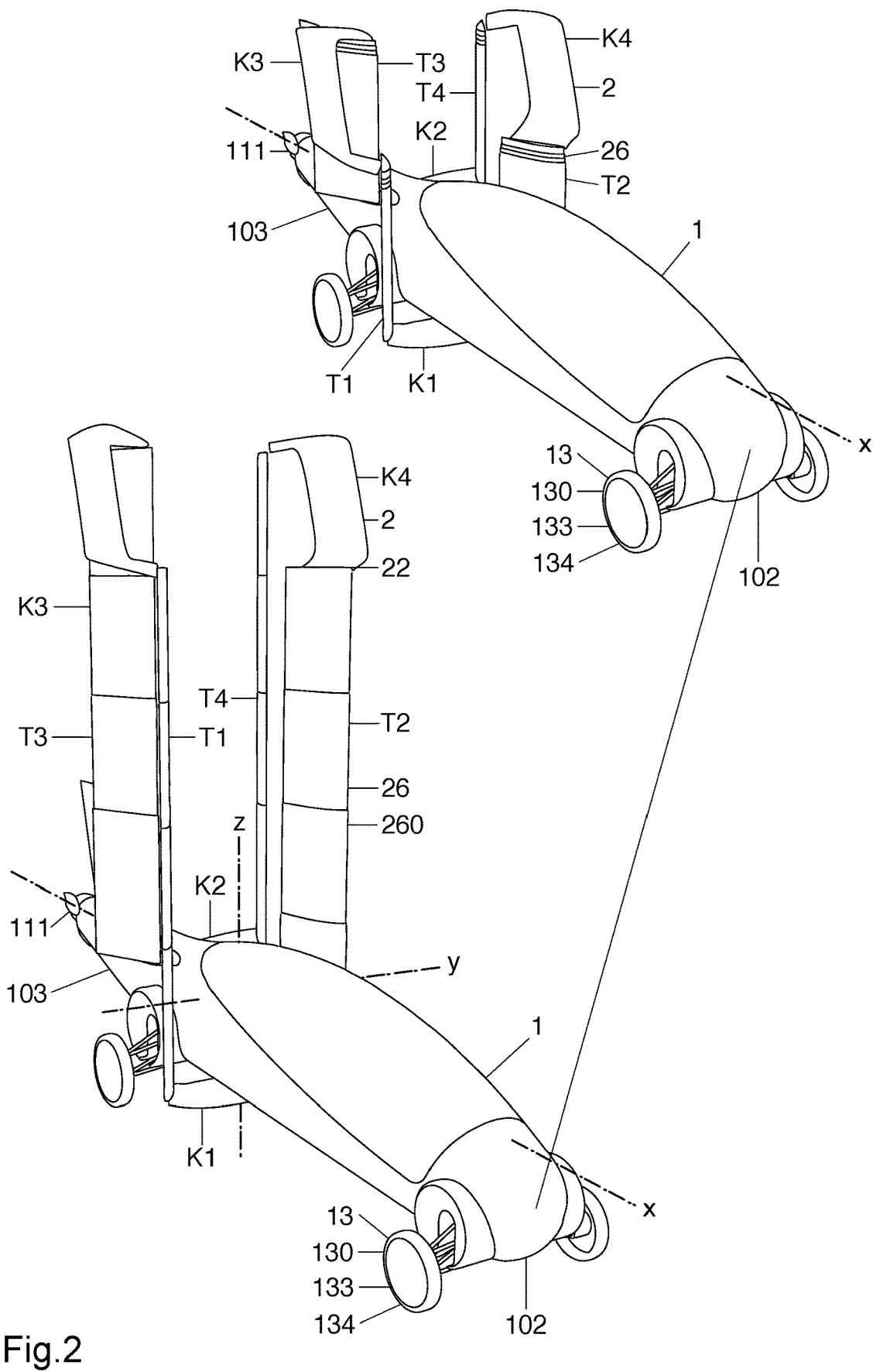
Figure 3:
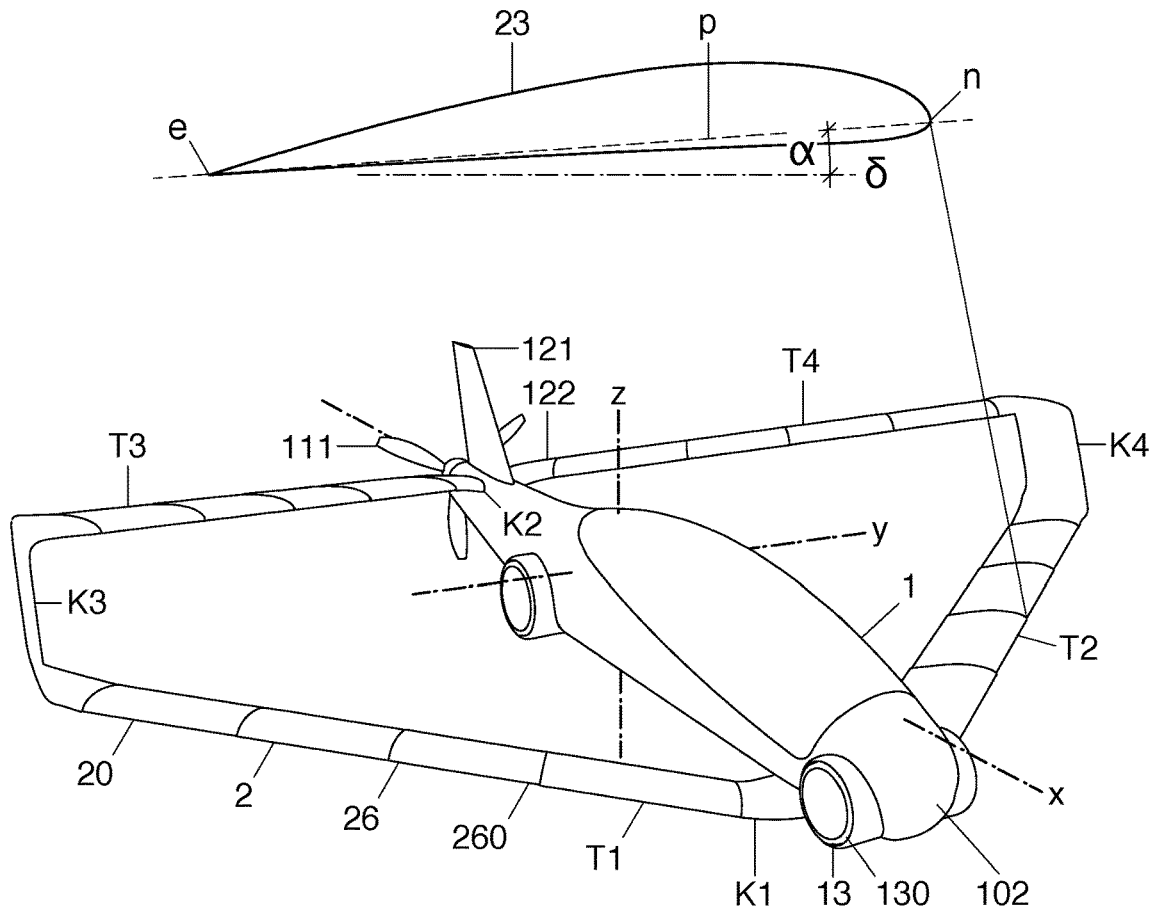
Figure 4:
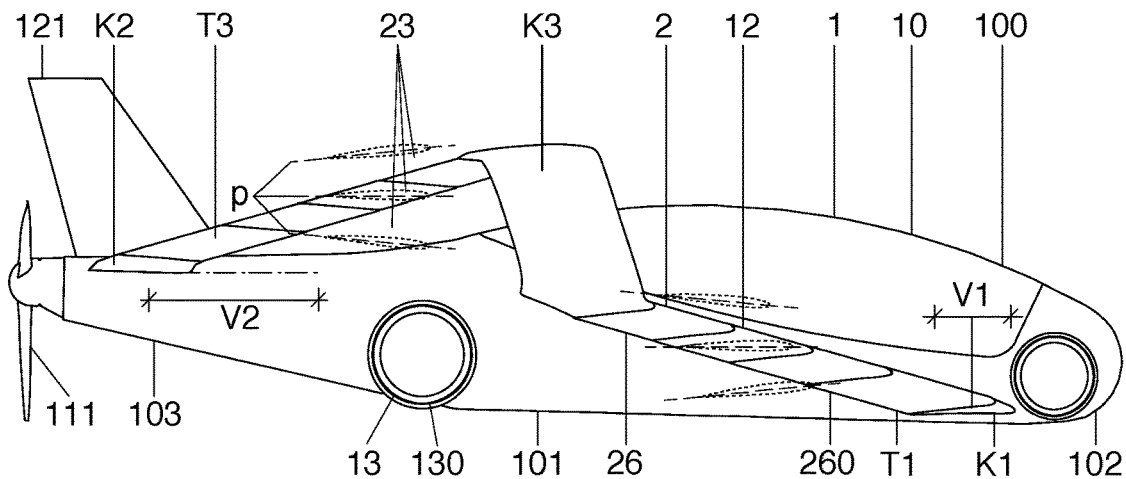
Figure 5:
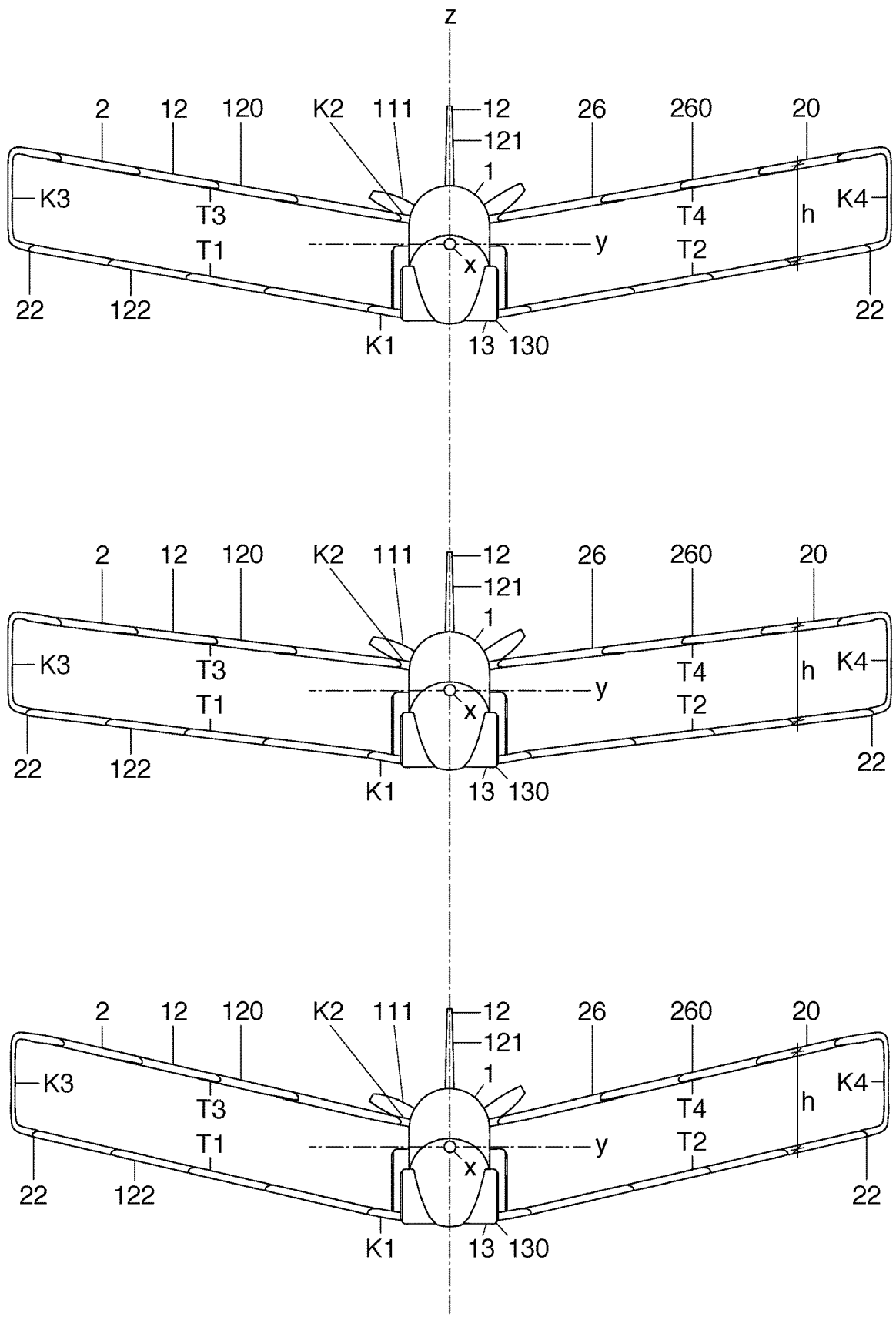
Figure 6:
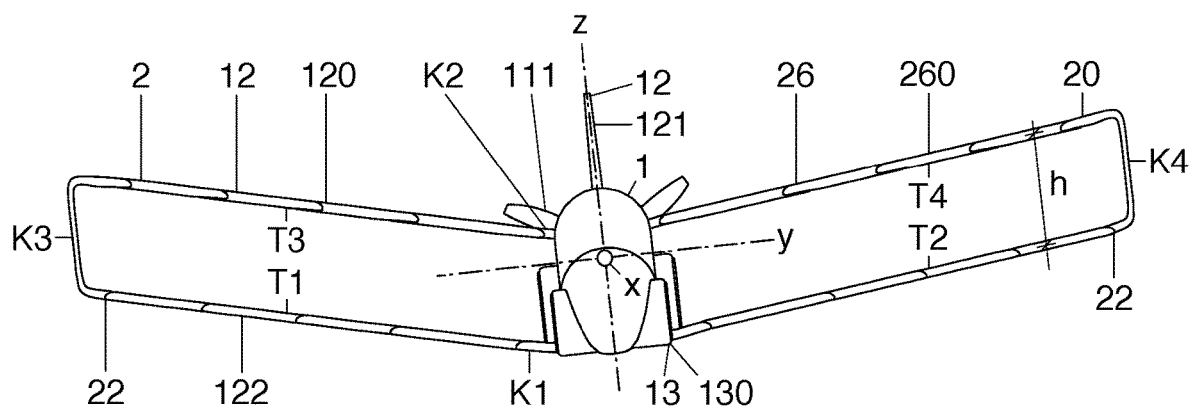
Figure 6:
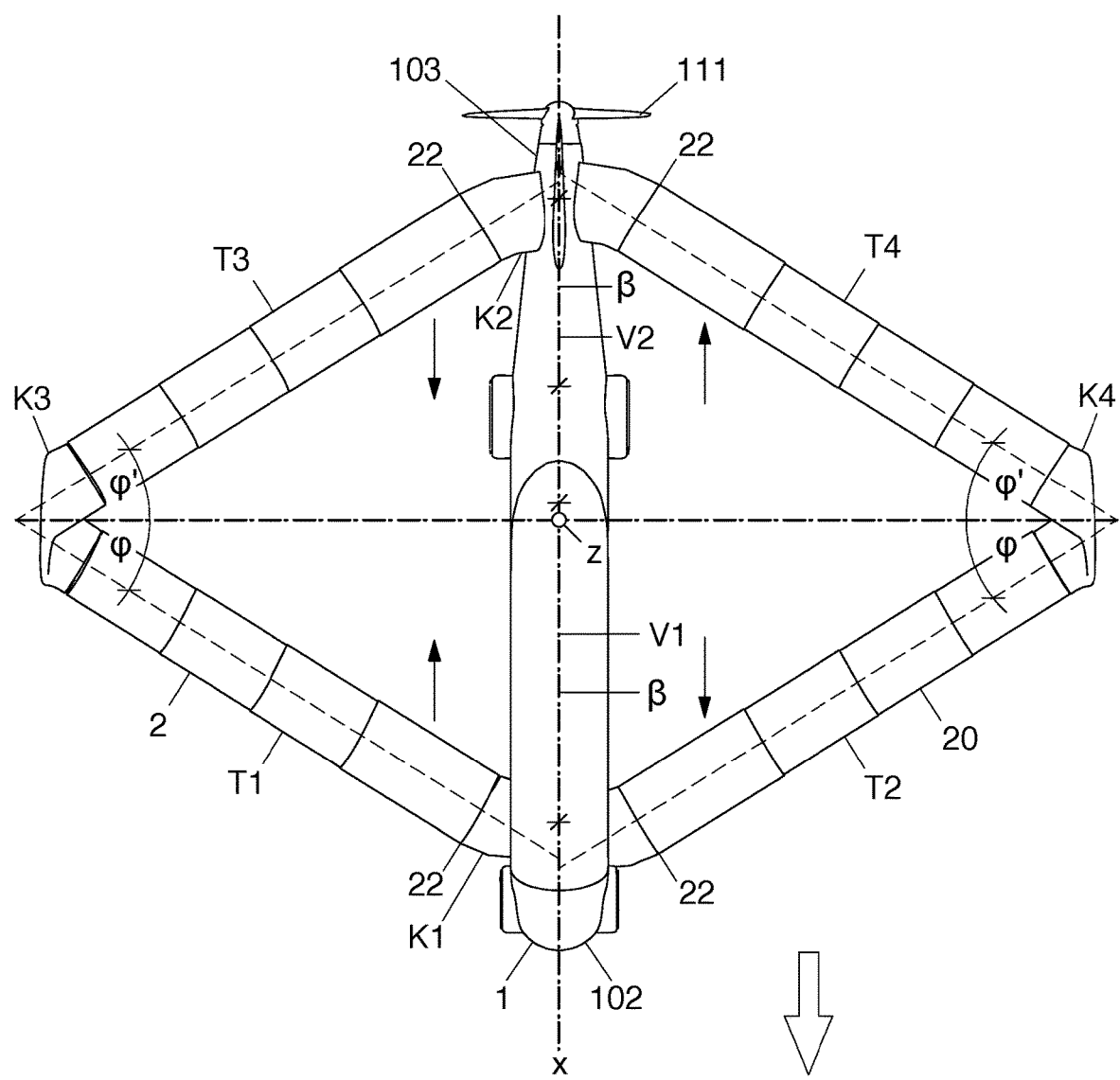
Figure 7:
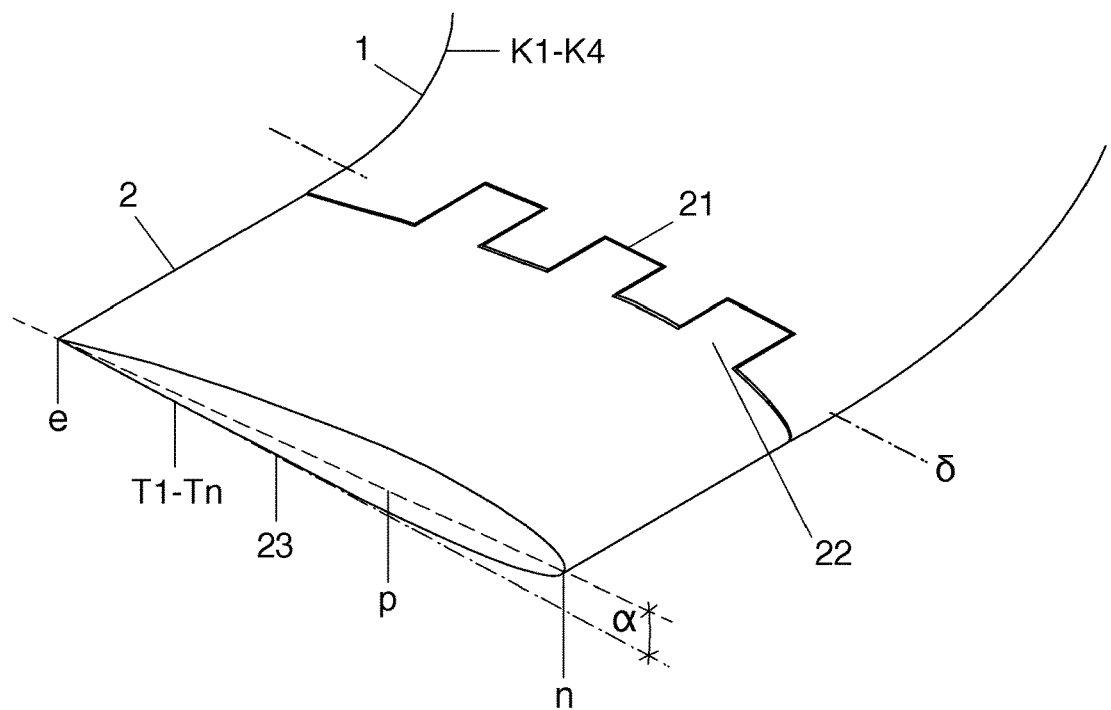
Figure 8:
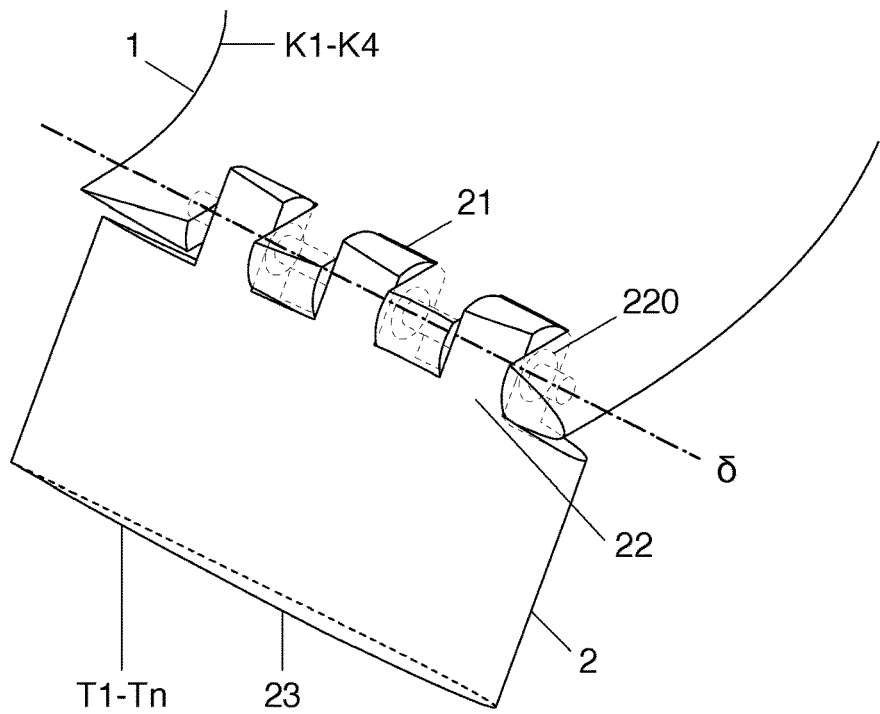
Figure 9:
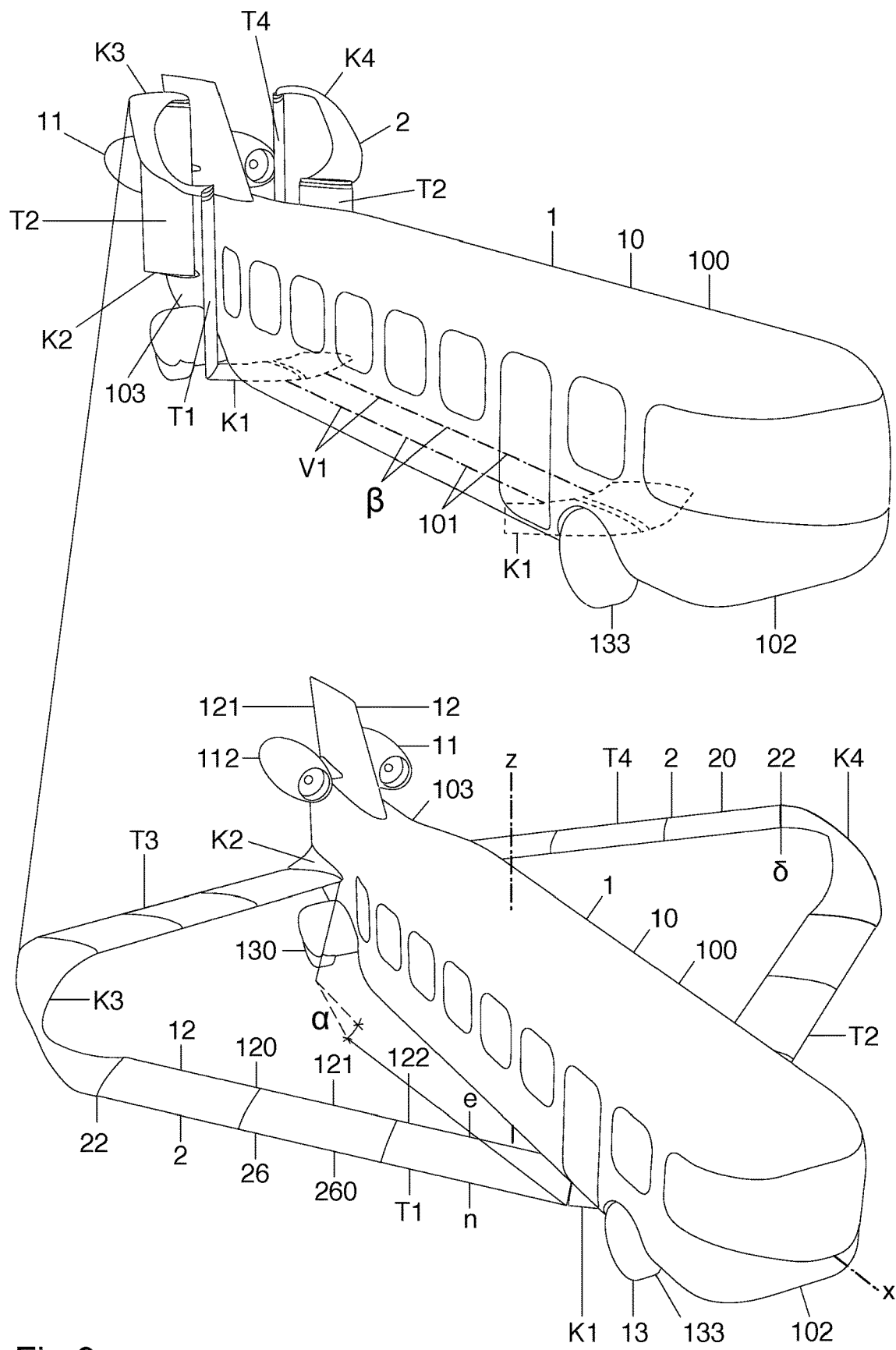
Figure 10:
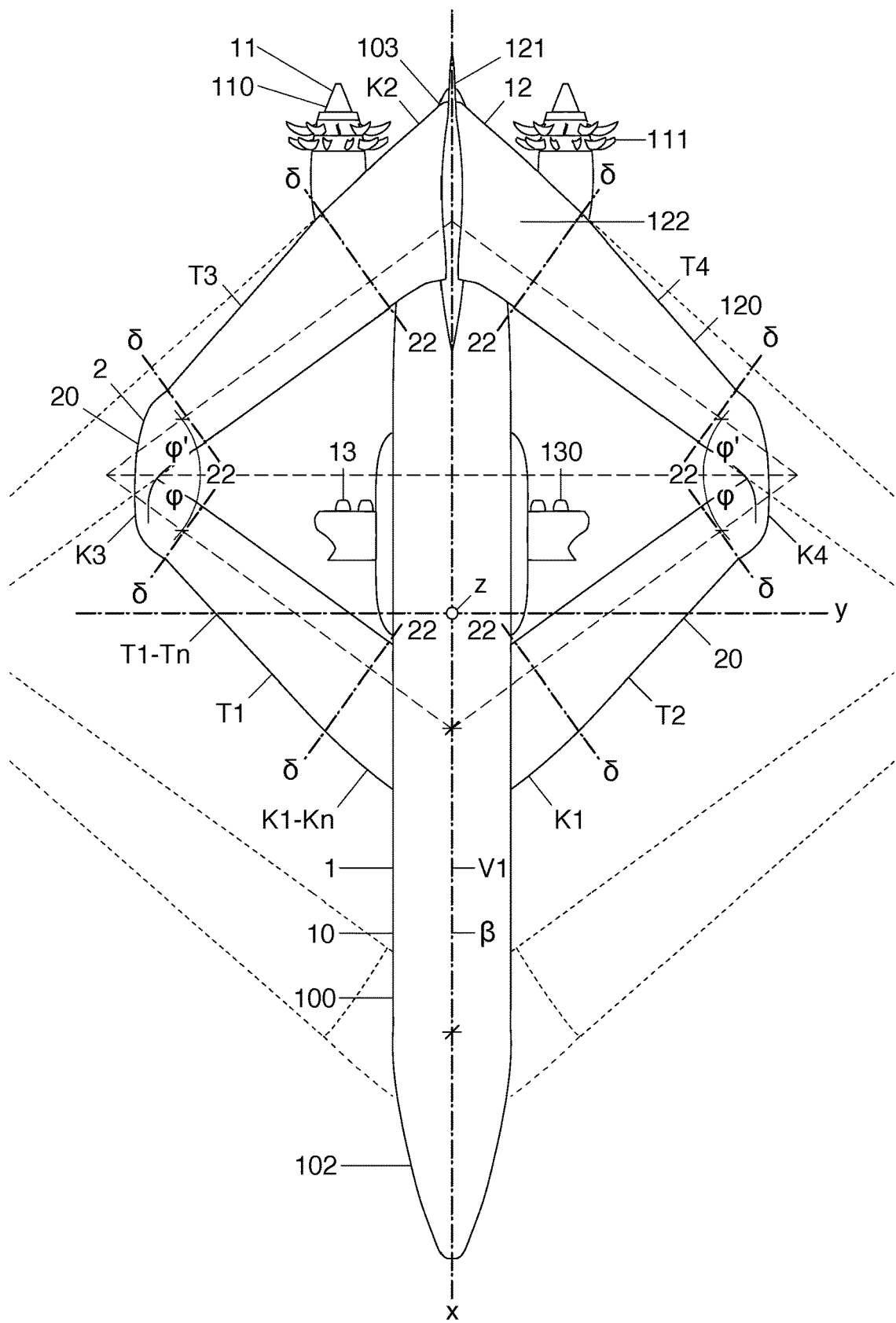
Figure 11:
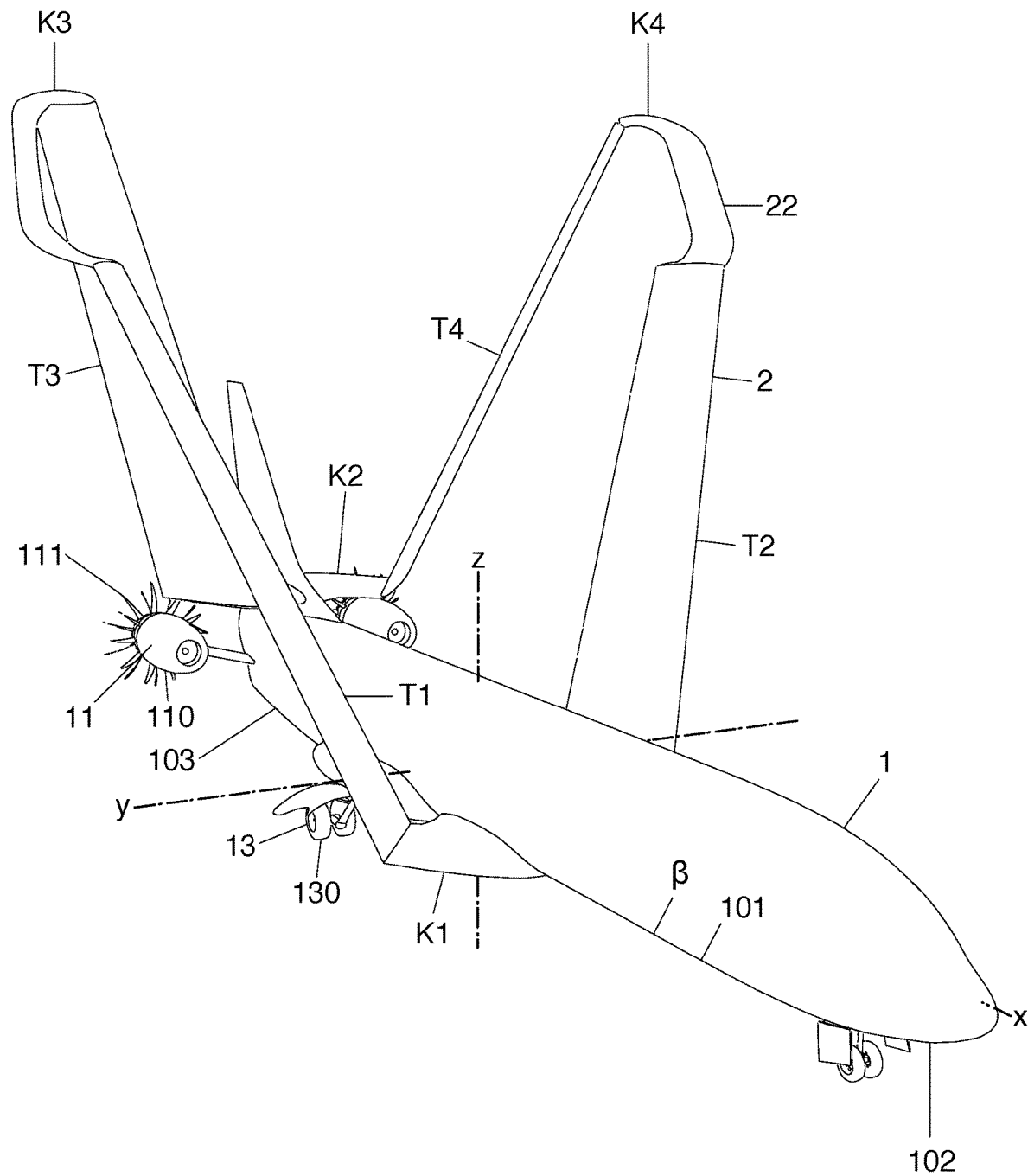
Figure 12:
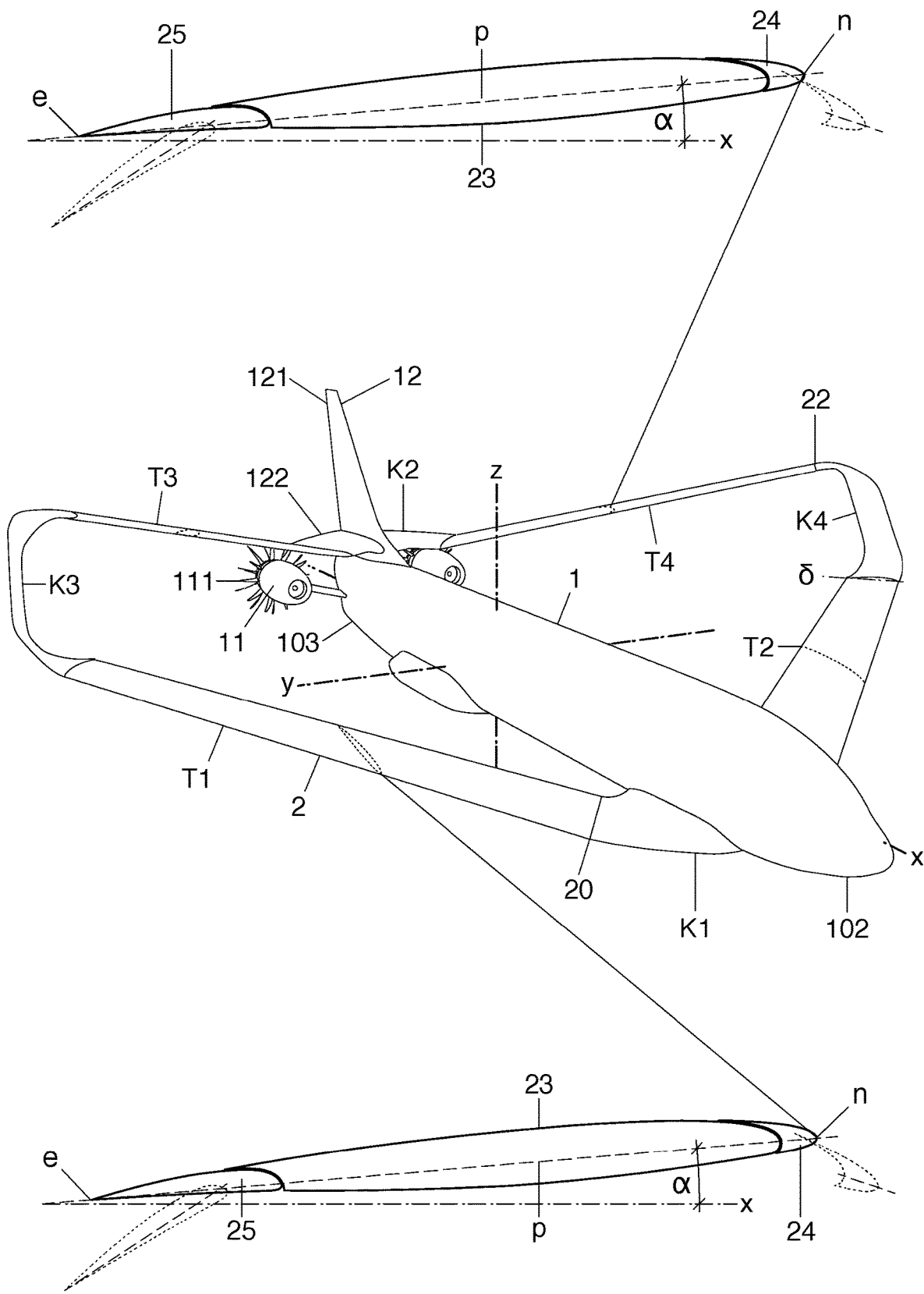
Figure 13:
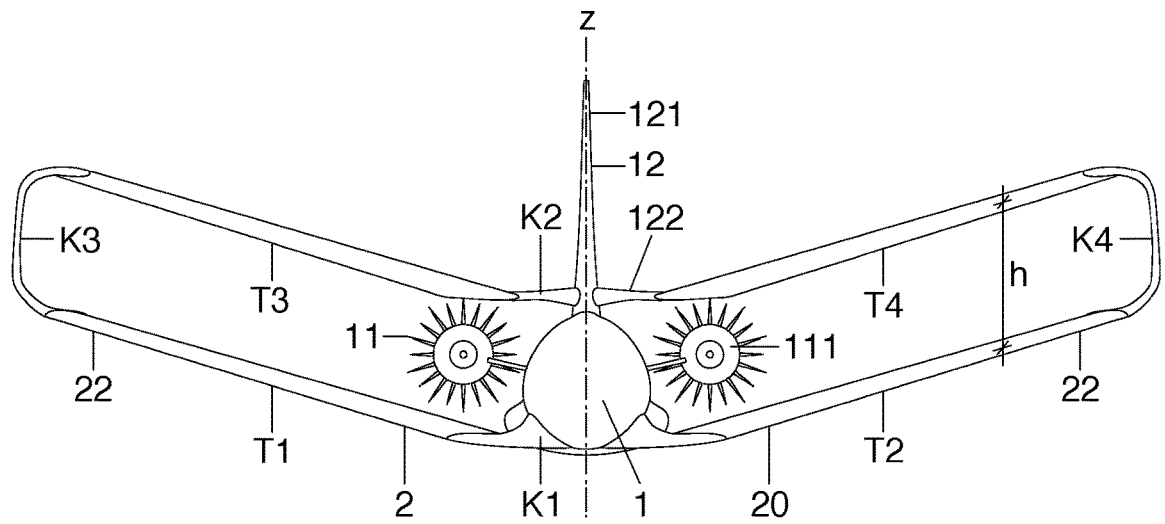
Figure 14:
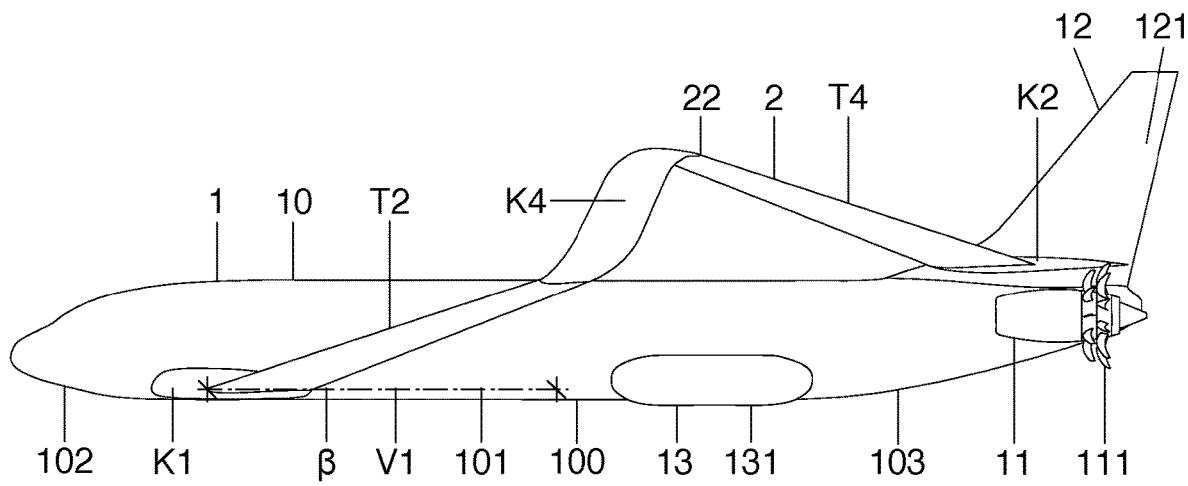
Figure 15:
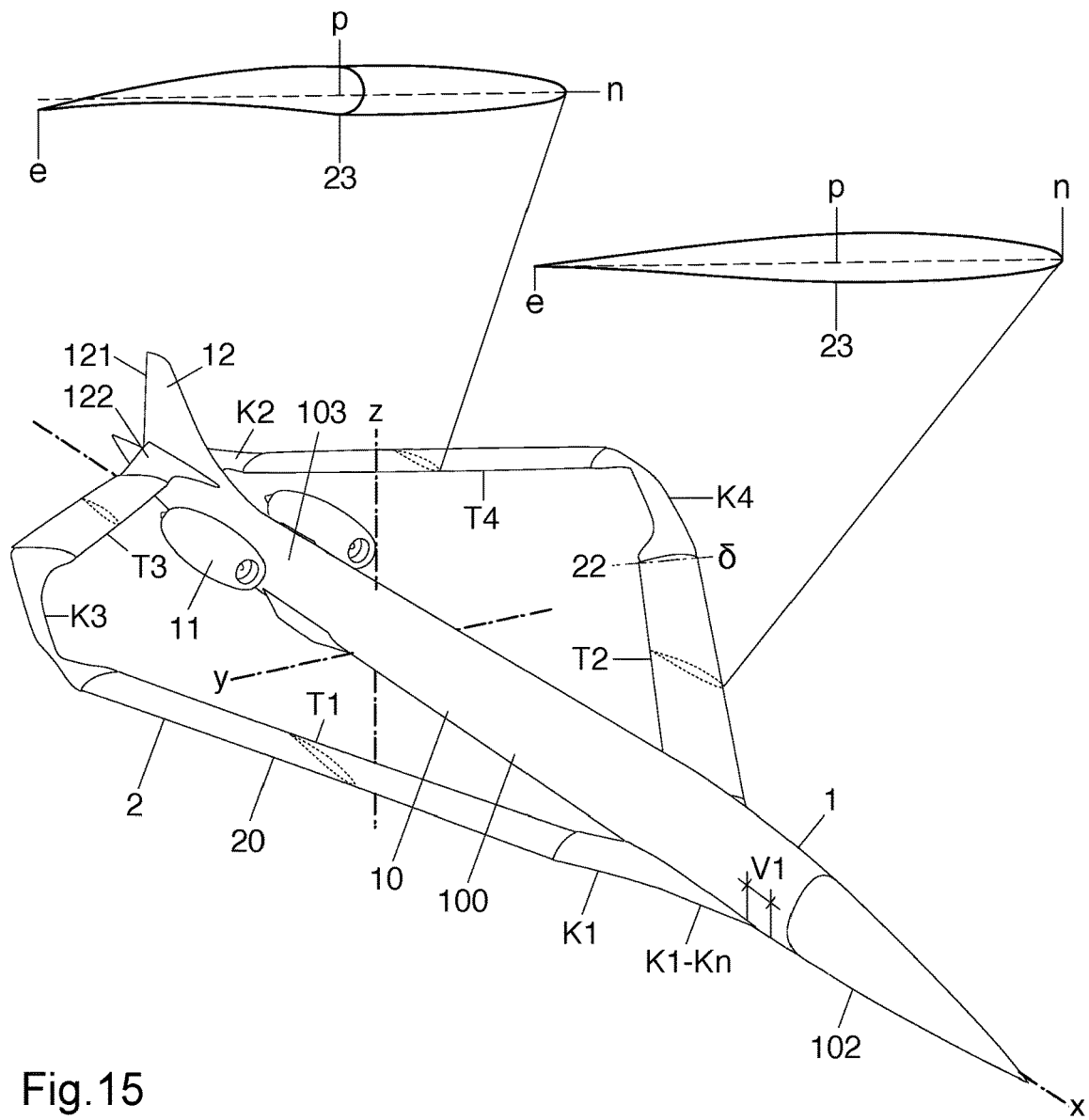
Figure 16:
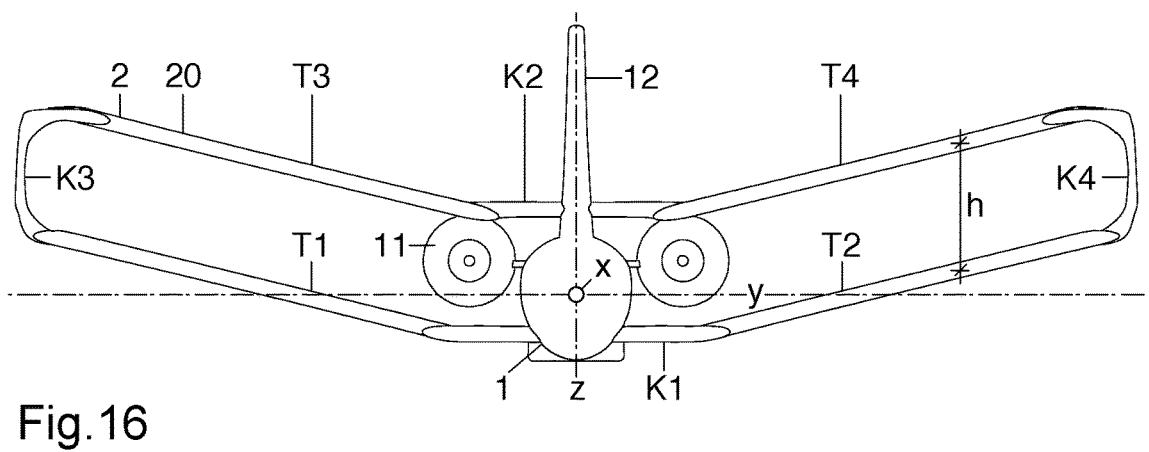
Figure 17:
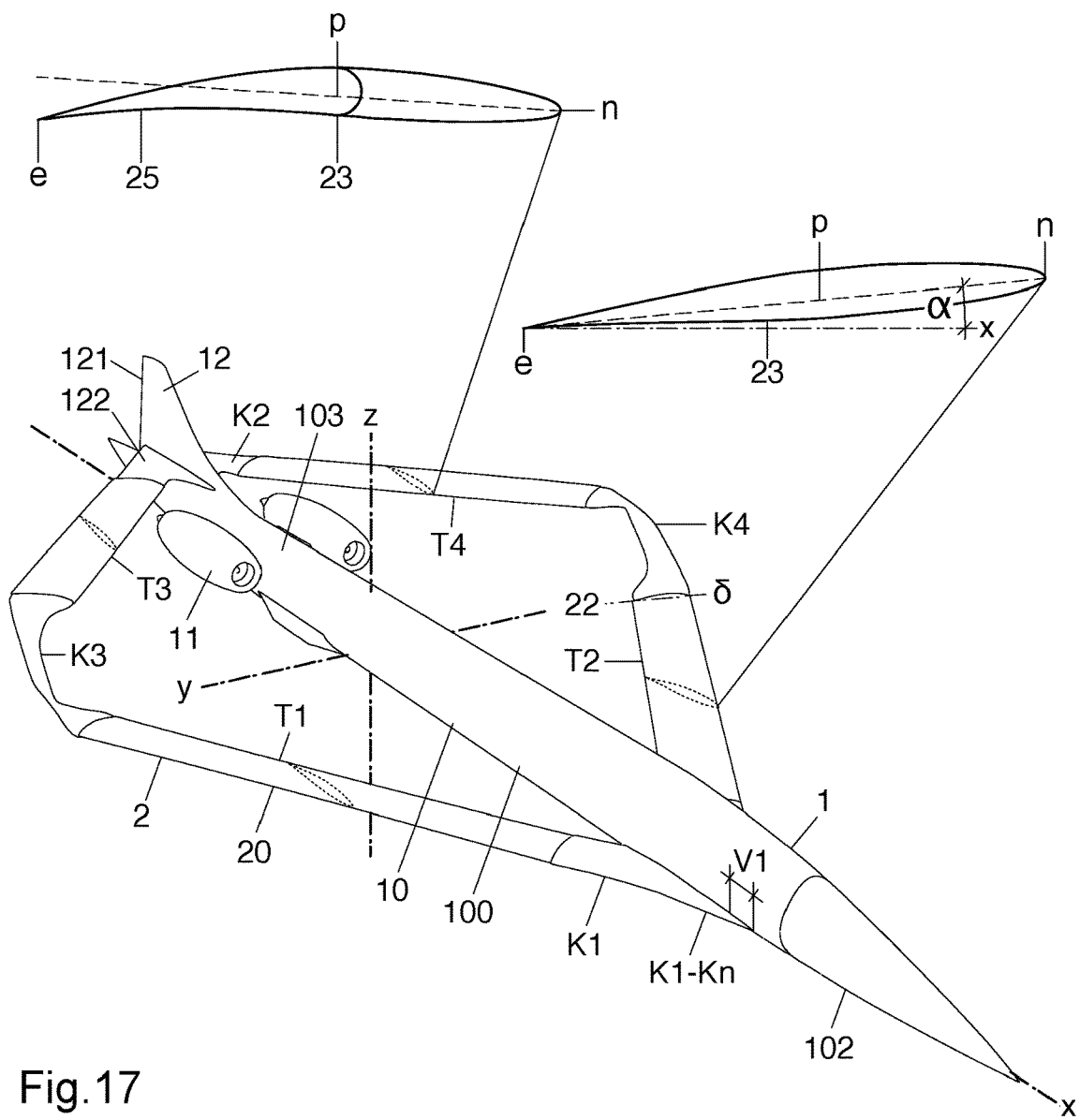
Figure 18:
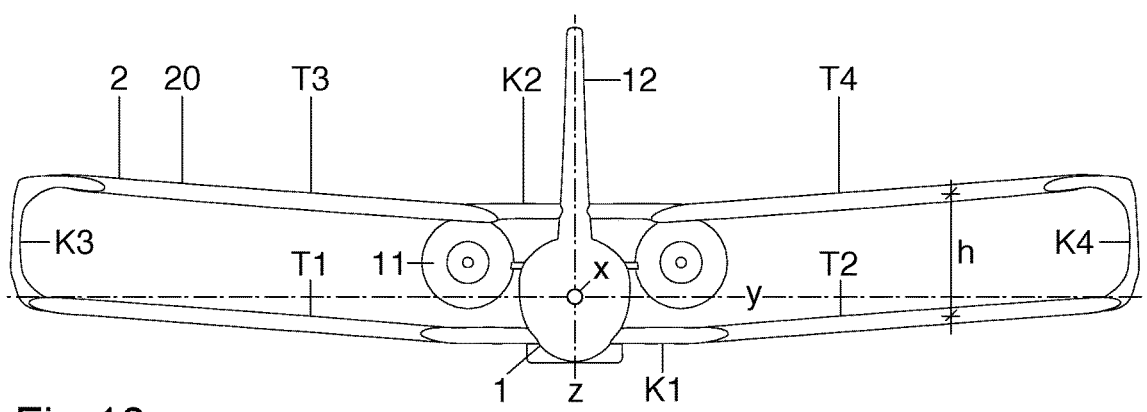
Figure 19:
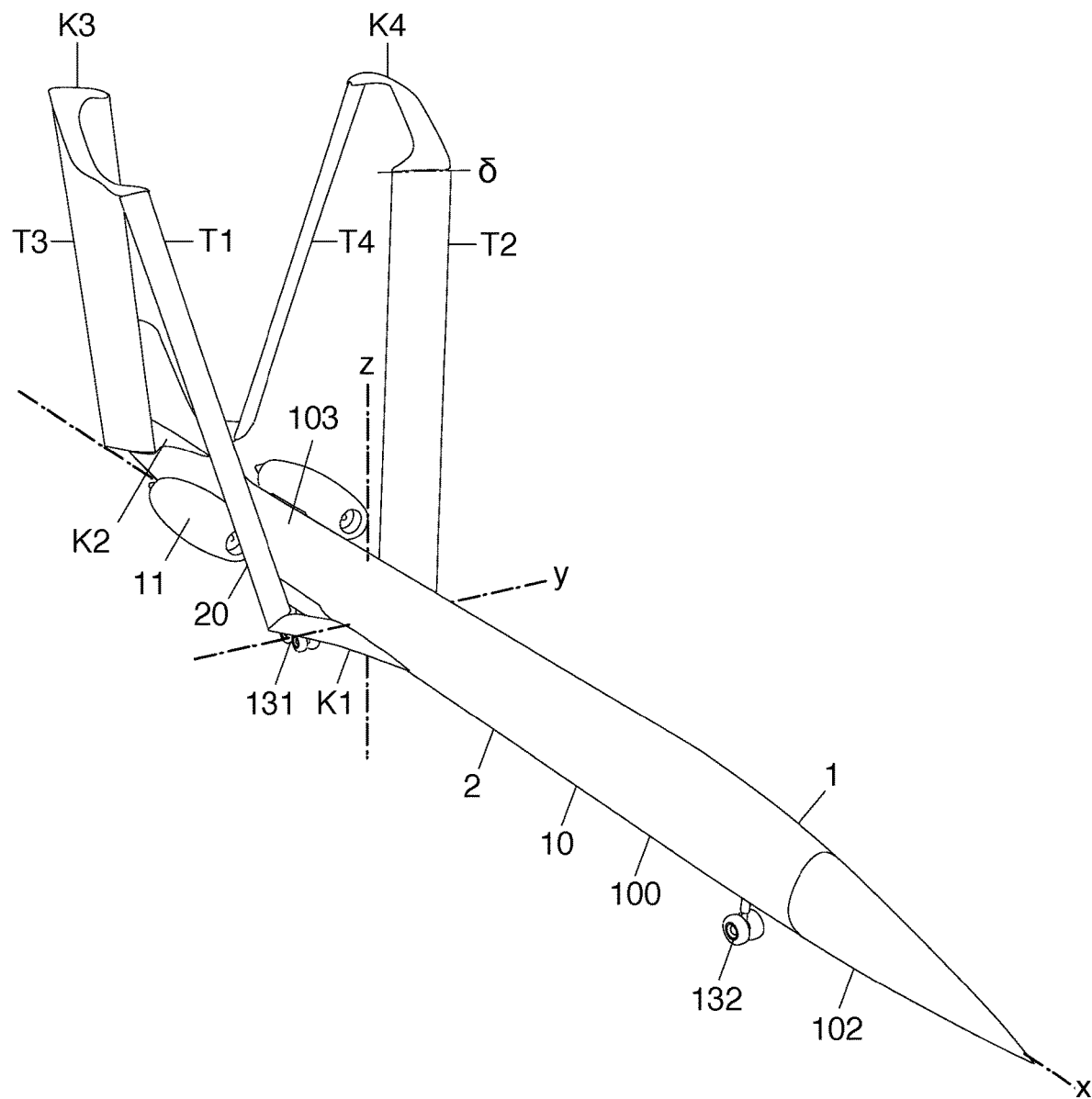
Figure 20:
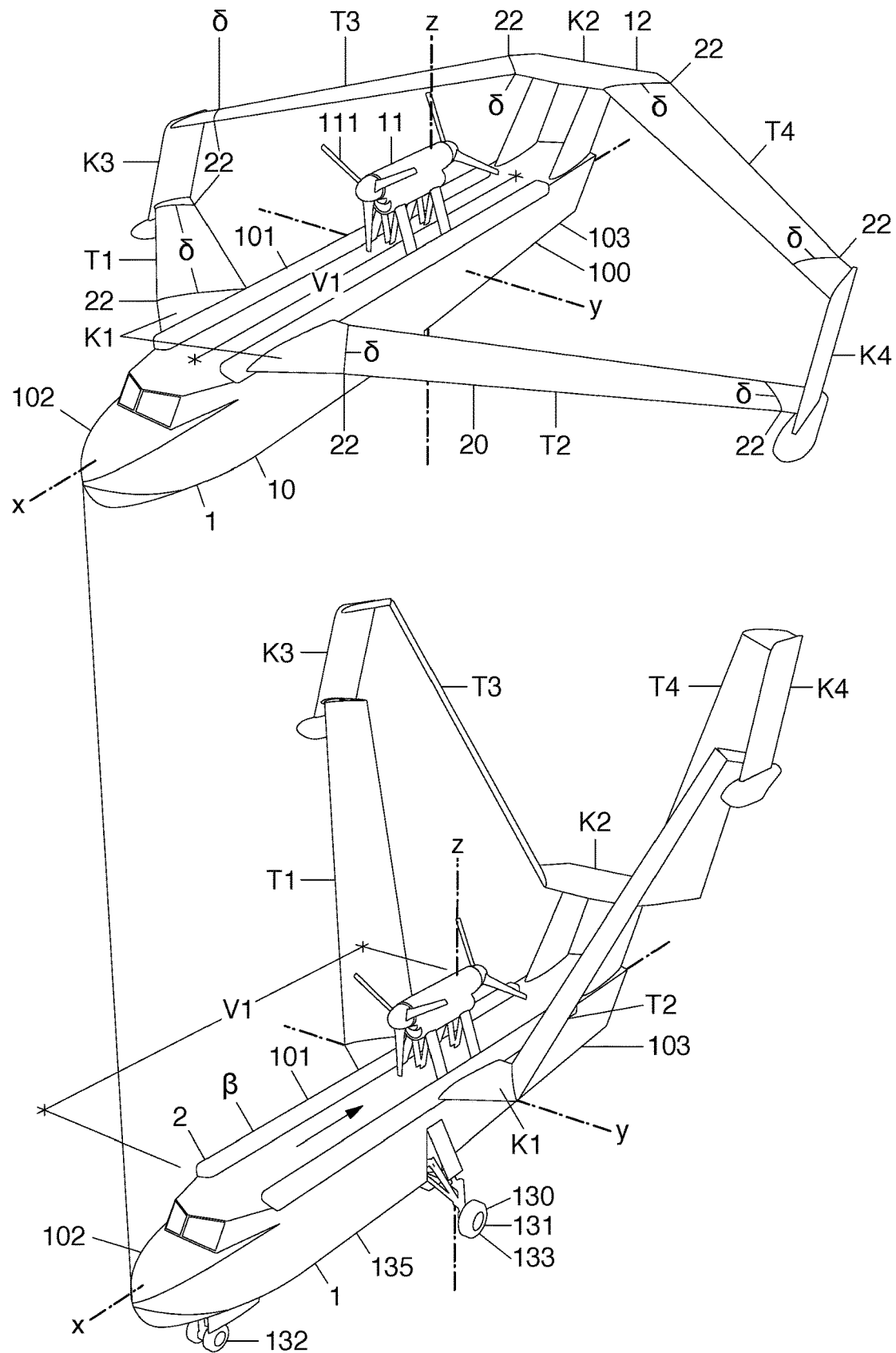
Figure 21:
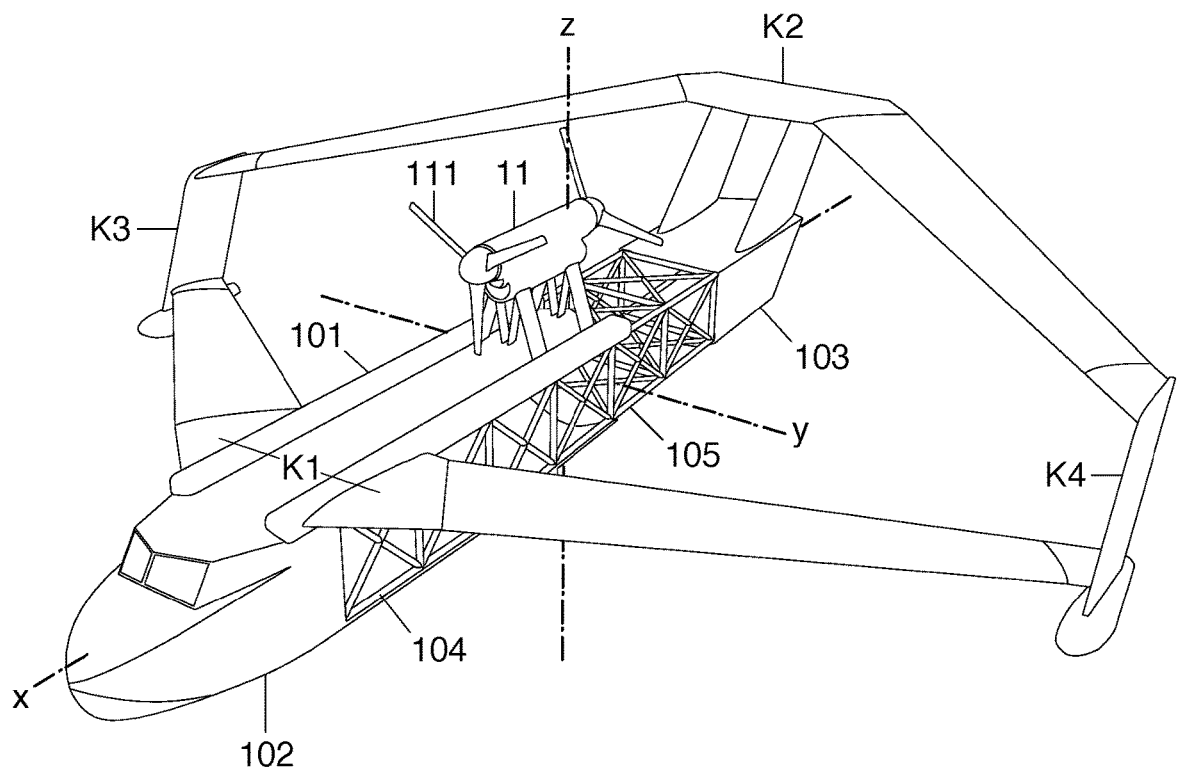
Figure 22:
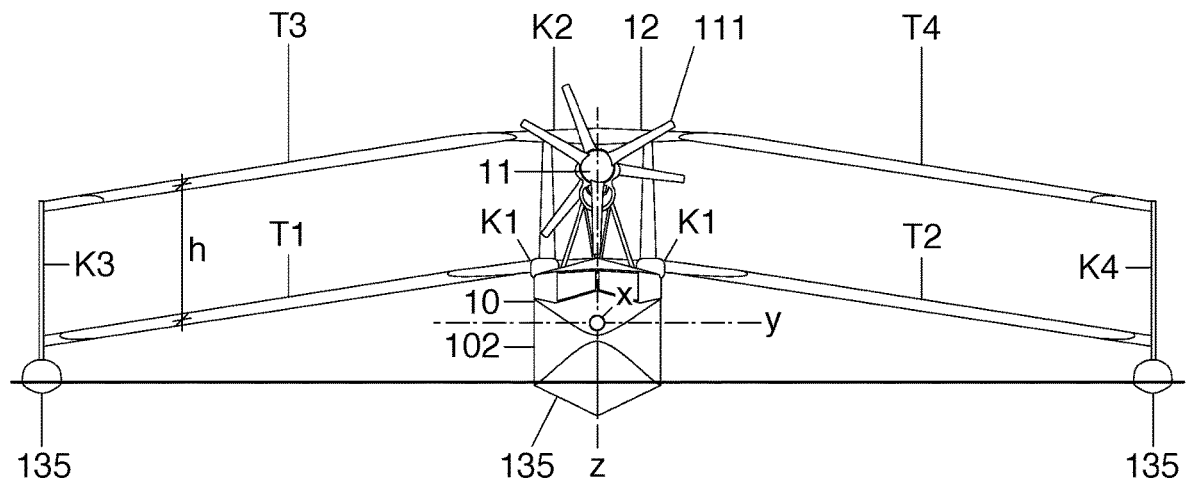

Further details and advantageous developments of the invention result from the embodiments described below and are shown in the drawings, which are in no way to be understood as a restriction of the invention, as well as from the subclaims. In the drawings:

FIG. 1 is a plan view of a flying car with an unfolded wing position for the flight mode and with dashed lines for a folded wing position for the stationary or driving modes, The top of FIG. 2 is an isometric overview of the flying car according to FIG. 1 with retracted telescopic wings, the bottom of FIG. 2 is an isometric overview of the flying car according to FIG. 1 with extended, vertical telescopic wings, FIG. 3 is a perspective overview of the flying car according to FIG. 1-2 with a positive V-position of the aerofoils unfolded for the flight mode, FIG. 4 is a side view of the flying car according to FIG. 1-3, FIG. 5 is a front view of the flying car according to FIG. 1-4 with different wing positions for the flight mode, at the top with a positive V-position of the aerofoils for a straight flight path, in the middle with a positive V-shaped wing position for climbing and at the bottom with a positive V-position of the aerofoils for the descent, FIG. 6 is a depiction of the flying car according to FIG. 1-5 with a positive V-position of the aerofoils for making a turn, at the top in the front view and at the bottom in the plan view, FIG. 7 is a perspective overview of the revolute joint between the fuselage and an aerofoil in the unfolded position of the folding structure, FIG. 8 is a perspective overview of the multi-sectional connection with the revolute joint of the folding structure according to FIG. 6 in the folded position, The top of FIG. 9 is a perspective overview of a flying bus with a folded wing position for the driving mode; the bottom is a perspective overview with an unfolded wing position for the flight mode, FIG. 10 is a plan view of a commercial aircraft with a folded wing position for the stationary or driving modes, FIG. 11 is a perspective view of the commercial aircraft according to FIG. 10 with a folded wing position for the stationary or driving modes, FIG. 12 is a perspective view of the commercial aircraft according to FIG. 10-11 with an unfolded wing position for the flight mode with detailed sections of the nose-side and tail-side aerofoils, FIG. 13 is a nose-side view of the commercial airliner according to FIG. 10-12 with the aerofoils being in the positive, unfolded V-position for the flight mode, FIG. 14 is a side view of the commercial aircraft according to FIG. 11-13 with the aerofoils being unfolded for the flight mode, FIG. 15 is a perspective overview of a supersonic aircraft with an unfolded wing position for supersonic flight with detailed sections of the nose-side and tail-side aerofoils, FIG. 16 is a front view of the supersonic aircraft according to FIG. 15 with the wing position intended for supersonic flight, FIG. 17 is a perspective overview of the supersonic aircraft according to FIG. 15-16 with an unfolded wing position unfolded for subsonic flight with detailed sections of the nose-side and tail-side aerofoils, FIG. 18 is a front view of the supersonic aircraft according to FIG. 15-17 with the wing position intended for subsonic flight, FIG. 19 is a perspective overview of the supersonic aircraft according to FIG. 15-18 with a folded wing position for the driving and stationary modes, FIG. 20 provides perspective representations of a seaplane, at the top with a negative V-position of the aerofoils intended for the flight mode and at the bottom with a folded wing position after the landing, FIG. 21 is a perspective representation of the seaplane according to FIG. 20 with a fuselage construction formed by a truss tube, FIG. 22 is a nose-side view of the seaplane according to FIG. 20-21 after a landing in the water with a negative V-position of the aerofoils.

FIG. 1 shows an aircraft 1, which is designed as a flying car and the folding system 2 of which is formed as a square or preferably diamond-shaped polygon ring 20 consisting of four aerofoils T1-T4 and node bodies K1-K4, ready for take-off in the unfolded operating position of the folding system 2. The node bodies can also be referred to as node points. In the embodiment, the node points K1 and K2 are each formed in pairs or with two halves, and they can also be referred to as node bodies K1.1, K1.2, K2.1, K2.2. In the embodiment, the node bodies K1 and also the node bodies K2 can be moved relative to one another on the port side and on the starboard side. However, it is also possible, for example, to make only the node bodies K1 or only the node bodies K2 movable relative to one another.

As shown in FIG. 2, the aerofoils T1-T4 are constructed as telescopic wings 26 from four aerofoil segments 260 each. In the starting setup, the four aerofoils T1-T4 preferably each have, at the wing root on the fuselage side, an angle of attack $\alpha$ of approximately 6 degrees, which is continuously reduced to approximately 2 degrees at the wing tips formed by the nodal bodies K3, K4. The wing profile 23 of the twisting aerofoils T1-T4 is asymmetrical and extends with a profile chord p from the wing nose n to the wing trailing edge e. The sectional views show a nose-side aerofoil T2 and a rear aerofoil T4. The wing-side aerofoils T1, T2 have a positive sweep angle $\varphi$ with respect to the transverse axis y of the aircraft 1 while the rear aerofoils T3, T4 have a negative sweep angle $\varphi'$ with respect to the transverse axis y of the aircraft 1. The aerofoils T1-T4 are connected to the node bodies K1-K4 by means of eight revolute joints 22, each with a horizontal rotation axis $\delta$. As shown in FIG. 3-4, the node bodies K3, K4 are each designed as a winglet. The node bodies K1, K2 have adjustment regions V1, V2, each with an associated translation axis $\beta$ for the folding process of the folding system 2, with the nose-side node body K1 being connected to the underside of the fuselage 10, while the tail-side node bodies K2 are connected to the top of the fuselage 10 via the empennage 12. If the adjustment regions V1, V2 of the node bodies K1, K2 are used to their maximum, the aerofoils T1-T4 of the folding system 2 can be transformed from an unfolded position intended for the flight mode to a maximally folded position intended for the driving and stationary modes. In flight, the flying car is driven, for example, by a propeller 111 connected to the tail 103 with four wheels 133 forming an undercarriage 130 driven by an electric motor during the driving mode. The polygon ring 20 is reinforced by the fuselage 10 of the aircraft 1.

The top of FIG. 2 shows the aircraft 1 designed as a flying car in the driving mode and at the bottom in preparation for the flight mode.

During the driving mode, the aerofoils T1-T4, which are each designed as telescopic wings 26, are in a vertical position, and the aerofoil segments 260 of the telescopic wings 26 are pushed into one another in such a way that the folding system 2 forms a compact bundle at the rear of the flying car. The four wheels 133 of the flying car each have car tires 134 and are used as a landing gear 13 during the flight mode. To initiate the flight mode, three of the aerofoil segments 260 of a telescopic wing 26 are extended out of a fourth aerofoil segment 260 so that the aerofoils T1-T4 reach their final length intended for the flight mode.

FIG. 3 shows the flying car according to FIG. 1-2 with unfolded aerofoils T1-T4 in the flight mode. The nose-side node bodies K1 are in a central basic position provided for the flight mode in a front position of the adjustment region V1, while the tail-side node bodies K2 assume a rear position of the adjustment region V2. For a straight flight path, the profile chord p of the asymmetrical wing profile 23 of the aerofoils T1-T4 has an angle of attack α with the aerofoils T1-T4, as shown in FIG. 5, being arranged at a vertical distance h with respect to the vertical axis z and preferably parallel to one another. In the embodiment, the aerofoil segments 260 of the telescopic wings 26 have neither adjustable slats on the wing noses n nor adjustable wing flaps on the wing trailing edges e since the aerofoils T1-T4 form an empennage 12 during the flight mode. As shown in FIG. 4, the adjustment region V1 of the node body K1 is used to change the angle of attack α of the profile chords p of the nose-side aerofoils T1, T2 and the tail-side aerofoils T3, T4 relative to each other in opposite directions so that the aircraft 1 can switch from a straight flight path to a descent or climb.

FIG. 4 shows the flying car according to FIG. 1-3 in a starboard-side view with the aerofoils T1, T3 and the node bodies K1-K3. The adjustment regions V1, V2 of the node bodies K1, K2 allow for different operating positions of the aerofoils T1-T4 so that the folding system 2 forms an empennage 12 or has the function of a empennage. In the basic position provided for a straight flight path, the profile chord p of the wing profile 23 of the aerofoils T1-T4 has a slight angle of attack with respect to the longitudinal axis x. If the node bodies K1 are shifted further back so that the distance between the nose-side node bodies and the tail-side node bodies is reduced, the flying car goes into a descent, which reduces the lift on the nose-side aerofoils T1, T2 and increases the lift on the tail-side aerofoils T3, T4. If the node bodies K1 are displaced forwards from the middle basic position intended for the straight flight path so that the distance between the nose-side node bodies K1 and the tail-side node bodies K2 increases, the lift on the tail-side aerofoils T3, T4 is decreased and increased on the nose-side aerofoils T1, T2 so that the flying car begins to climb.

FIG. 5 shows the flying car according to FIG. 1-4 in three nose-side views with the aerofoils T1-T4 in a positive V-position:

The top of FIG. 5 for a straight flight path, the middle of FIG. 5 for a climb, and the bottom of FIG. 5 for a descent. As shown in FIG. 4, the respectively different operating positions of the aerofoils T1-T4 result from a respectively different distance between the node bodies K1 and the node bodies K2 within the adjustment regions V1, V2. Since the angle of attack of the nose-side aerofoils T1, T2 and the tail-side aerofoils T3, T4 can be changed in opposite directions with the distance between the node bodies K1, K2 within the adjustment region V1, the folding system 2 can take on the function of an empennage 12. This function of an empennage can include the trimming or the complete function including turning, climbing, descending, etc., for which rudders such as the horizontal stabilizer, the vertical stabilizer and wing flaps were previously used. In addition, further systems can be provided for the function of the empennage, for example, a vertical stabilizer or movable, extendable slats. This is not absolutely necessary, however. The aerofoils T1, T2 connected to the nose-side node bodies K1 and the aerofoils T3, T4 connected to the tail-side node bodies K2 are at a vertical distance h from one another in each operating position and are preferably aligned parallel to one another with respect to the vertical axis z. The wheels of the undercarriage 130 are placed against the fuselage 10 during the flight mode of the flying car in order to reduce the air resistance.

FIG. 6 shows the flying car according to FIG. 1-5 with a wing position of the aerofoils T1-T4 for making a turn. The halves of the node bodies K1, K2 provided in pairs can be adjusted independently of one another. While the distance between the halves of the node bodies K1, K2 on the starboard side in the flight direction was shortened compared to the basic position provided for a straight flight path as shown in FIG. 1, the distance of the port-side halves of the node bodies K1, K2 was lengthened compared to the average basic position provided for a straight flight path so that the lift produced by the aerofoils is greater on the port side than on the starboard side, and the aircraft 1 therefore flies a right turn.

FIG. 7 shows an example of a revolute joint 22 of the folding system 2 for an aircraft 1 according to the invention in the unfolded position for the flight mode. The node bodies K1-K4 and the aerofoils T1-T4 are each interlocked by complementary projections and recesses, which are traversed by the horizontal rotation axis δ so that a multi-sectional connection 21 is formed, which allows an aerofoil T1-T4 to be clamped on one side on a node body K1-K4. The revolute joint 22 has a multi-sectional connection 21 and only one degree of freedom required for a rotary movement. Multi-sectional connections are also referred to as hinged band connections or piano hinge connections.

FIG. 8 shows the revolute joint 22 according to FIG. 7 in a folded operating position provided for the driving and stationary modes of an aircraft 1 according to the invention. The multi-sectional connection 21 between the complementary projections and recesses of the node bodies K1-K4 and the aerofoils T1-T4 is formed by rolling bearings 220, which are arranged concentrically and coaxially to the horizontal rotation axis δ and consist of rollers, balls or cones, which ensure the rotatability of the revolute joint 22 about the horizontal rotation axis δ even when the node bodies K1-K4 are torsion-stressed during the flight mode. The revolute joint 22 can be locked in the position provided for the flight mode by means of a lock, which is not shown in detail.

Alternatively, the revolute joint can be designed as a single-shear revolute joint or as a bending/articulated joint with a virtual rotation axis in order to allow for at least one deformation by moving the fuselage-side node bodies K1, K2, as is required for trimming, for example. Such a bending/articulated joint can be designed, for example, in the form of a wasp waist between the node body K1, K2 and an associated aerofoil T1-T4, with the wasp waist preferably having an upper groove and a lower groove in the region of the virtual rotation axis.

The top of FIG. 9 shows an aircraft 1 which, while driving, can be a bus on the road and on which the folding system 2 is folded to form a compact bundle at the rear 103 of the bus.

The bottom of FIG. 9 shows the aircraft 1 with the polygon ring 20 of the folding structure 2 unfolded for the flight mode. As shown at the top of FIG. 9, the aerofoil segments 260 of the telescopic wings 26 aligned parallel to the vertical axis z are first extended and form the aerofoils T1-T4 in full length for the transition from the flight to the driving mode. In a second step, both halves of a two-part node body K1 are then shifted synchronously on the rails 101 on the underside of the fuselage 10 in the direction of the tail 102 and firmly connected to the fuselage 10 in the foremost position of the adjustment region V1 so that the aerofoils T1-T4 have, in a basic position of the folding system 2 intended for a straight flight path, an angle of attack α of less than or equal to 6 degrees. As shown in FIG. 4-6, the climb or descent of the aircraft 1 can be initiated by bringing about a change in the angle of attack α in opposite directions, in each case on the starboard-side aerofoils T1, T3 and on the port side aerofoils T2, T4 via a slight displacement of the nose-side node body K1 within the adjustment region V1. A node body K1 divided in two halves makes it possible for the starboard-side aerofoils T1, T3 and the port-side aerofoils T2, T4 to be adjusted independently of one another on two separate rails 101 so that the aerofoils T1-T4 can take on the function of an empennage with ailerons, side rudders and elevons. The undercarriage 130 consists of four wheels 133 and serves as a landing gear 13 in that the aircraft 1 first touches down on the rear wheels 133 during landing. The engine 11 consists, for example, of two electrically operated fan engines that are connected to the empennage 12 at the rear. The polygon ring 20 with telescopic wings 26 makes it possible to adapt the dimensions of an aircraft 1 to the dimensions of a bus so that the aircraft 1 can drive on as a bus immediately after landing.

FIG. 10 provides a plan view of an aircraft 1 that is a commercial aircraft with a folding system 2 formed by four aerofoils T1-T4 and knot bodies K1-K4 in a folded operating position provided for driving and stationary modes. The sweep angle φ of the two nose-side aerofoils T1, T2 is positive while the two rear-side aerofoils T3, T4 have a negative sweep angle φ' with respect to the transverse axis y of the aircraft 1. The aerofoils T1-T4 are each connected at both ends by means of revolute joints 22 with horizontal rotation axes δ with the node bodies K1-K4 so that the folding system 2 formed by a square polygon ring 20 has a total of eight revolute joints 22 and eight horizontal rotation axes δ. The starboard-side and the port-side outer node bodies K3, K4 are, as shown in FIGS. 3 and 5, each designed as a winglet. The square polygon ring 20 is reinforced in every position of the folding system 2 by a fuselage 10 of the aircraft 1 designed as a tube 100. The node bodies K1 connected to the underside of the tube 100 have an adjustment region V1 and are at the shortest distance from the node bodies K2 in the maximally folded operating position of the folding system 2. As shown in FIG. 12, the node bodies K1 are, in the position provided for the flight mode, displaced to the front end of the adjustment region V1 so that the node bodies K1, K2 are at a greater distance from one another.

FIG. 11 shows the commercial aircraft according to FIG. 10 in a folded operating position of the polygonal ring 20 in which the node bodies K1-K4 and the aerofoils T1-T4, as shown in FIG. 10, are interconnected to form a folding system 2 by means of eight revolute joints 22 with eight preferably horizontal rotation axes δ. The perspective view shows the commercial aircraft with folded aerofoils T1-T4, with two engines 11 as prop-fan engines 110 with propellers 111 and with an empennage 12 and a landing gear 13, which is formed by a retractable undercarriage 130, with a main undercarriage 131 and with a nose-side support undercarriage 132. After the landing, the aerofoils T1-T4 are folded up by displacing the nose-side node body K1 on the translation axis β of the folding system 2 formed by a rail 101 in the direction of the tail-side node body K2, which is rigidly connected to the empennage 12. The commercial aircraft therefore takes up less space in its final parking position at the terminal and also when locations are switched.

FIG. 12 shows the commercial aircraft according to FIG. 10-11 in the flight mode with unfolded aerofoils T1-T4, each of which has a supersonic, asymmetrical wing profile 23 with a movable nose n formed by a slat 24 and an adjustable wing trailing edge e with a wing flap 25. The profile chord p connects the wing nose n with the wing trailing edge e and has an angle of attack α of less than or equal to 6 degrees at least at the fuselage-side wing root. During the flight mode, the node bodies K1, K2 are each connected to the fuselage 10 so that they can be locked in predeterminable positions and so that the polygonal ring 20 together with the fuselage 10 forms an airframe that is resistant to bending, shear and torsion.

FIG. 13 shows the commercial aircraft according to FIG. 10-12 in a nose-side view with the unfolded aerofoils T1-T4 in a positive V-position. The aerofoils T1, T2 are connected to the nose-side node bodies K1 and have a vertical distance h from the aerofoils T3, T4 connected to the tail-side node bodies K2, with the starboard-side aerofoils T1, T3 and the port-side aerofoils T2, T4 each being preferably arranged parallel to one another with respect to the vertical axis z of the aircraft 1 and being connected to one another by means of the node bodies K3, K4 designed as winglets.

FIG. 14 is a port-side view of the aircraft according to FIG. 10-13. While the nose-side aerofoil T2 describes a rising line from the node body K1 to the node body K4, the tail-side aerofoil T4 declines from the node body K4 to the node body K2. The adjustment region V1 for the node bodies K1 and the landing gear 13 with a retracted main undercarriage 131 are marked on the underside of the fuselage 10, which is designed as a tube 100.

FIG. 15 shows a supersonic aircraft with a folding system 2, which is formed by a polygon ring 20 with the node bodies K1-K4, four aerofoils T1-T4 of equal length and eight revolute joints 22 each with horizontal rotation axes δ and reinforced by a fuselage 10 in the form of a tube 100, which connects the nose-side node bodies K1 with the tail-side node bodies K2. The polygonal ring 20 is shown in the unfolded operating position intended for supersonic flight in which the profile chords p of the asymmetrical wing profile 23 are aligned substantially parallel to the longitudinal axis x of the aircraft 1, with a twisted angle decreasing in the direction of the node bodies K3, K4 designed as winglets being provided in each case with respect to the longitudinal axis x on the two nose-side aerofoils T1-T2 and on the two tail-side aerofoils T3, T4. The tail-side node bodies K2 are rigidly connected to the fuselage 10 via the empennage 12 while the nose-side node bodies K1 have an adjustment region V1 with a translation axis 3. For the supersonic flight, the node bodies K1 are in a rear position of the adjustment region V1 so that the aerofoils T1-T4, as shown in FIG. 16, assume a positive V-position and are preferably arranged parallel to one another with a vertical distance h with respect to the vertical axis z. Two powerful engines 11 connected to the tail 103 accelerate the aircraft to a flight speed greater than Mach 2, for example. For the subsonic flight illustrated in FIGS. 17 and 18, the node bodies K1 are displaced to a foremost position of the adjustment region V1.

FIG. 16 is a nose-side view of the supersonic aircraft according to FIG. 15 in supersonic flight mode. The vertical distance h between the nose-side aerofoils T1, T2 and the rear aerofoils T3, T4 is bridged by the node bodies K3, K4 designed as winglets.

FIG. 17 shows the supersonic aircraft according to FIG. 15-16 with the aerofoils T1-T4 fully unfolded in which the node bodies K1 are firmly connected to the fuselage 10 in a foremost position of the adjustment region V1, the wing-side aerofoils T1, T2 each have an angle of attack α with respect to the longitudinal axis x of the aircraft 1 and the rear halves of the tail-side aerofoils T3, T4 are designed as wing flaps 25 and folded down so that all four aerofoils T1-T4 provide more lift in the subsonic flight mode than in the supersonic flight mode.

FIG. 18 is a tail-side view of the supersonic aircraft according to FIG. 15-17 with the aerofoils T1-T4 being further lowered for the subsonic flight mode compared to the position intended for supersonic flight and with only a slight V-shape with an angle of 4.5 degrees with respect to the transverse axis y. A positive V-position of the aerofoils T1-T4 avoids an undesired dead position of the folding system 2 in which the aerofoils T1-T4 and the node bodies K1-K4 lie in one plane. The positive V-position of the aerofoils T1-T4 makes it possible to initiate the folding mechanism of the polygonal ring 20 without undue effort by simply initiating the displacement of the node body K1 from the foremost position within the adjustment region V1 by moving the node body K1 on the translation axis β toward the node body K2 fixed to the tail 103 so that, as shown in FIG. 19, the aerofoils T1-T4 assume a space-saving, upright position in an operating position provided for the driving and stationary modes of the supersonic aircraft.

FIG. 19 shows the supersonic aircraft according to FIG. 15-18 in the maximally folded operating position of the folding system 2 formed by the polygon ring 20, which is intended for the driving and stationary modes.

FIG. 20 shows a seaplane, at the top in the straight flight path and at the bottom after a landing with the undercarriage 130 extended. The fuselage 10 of the seaplane is designed as a polygonal tube 100. Two nose-side aerofoils T1, T2 with a negative V-position are each articulated by means of revolute joints 22 with rotation axes δ at their fuselage-side end to one of the two node bodies K1 and at their outer end to the node bodies K3, K4 while two tail-side aerofoils T3, T4, also with a negative V-position, are articulated to a node body K2 that is firmly connected to the empennage 12. If the distance between the node bodies K1, K2 in an aircraft 1 with a negative V-position of the aerofoils T1-T4 is decreased, the aircraft 1 goes into a climb, but if the distance between the node bodies K1, K2 in an aircraft 1 with a negative V-position of the aerofoils T1-T4 is increased, the aircraft 1 goes into a descent. The nose-side node bodies K1 are displaceable independently of one another along a respectively associated translation axis β within an adjustment region V1. As shown above in FIG. 21, the two node bodies K1 are each connected to the upper chord bars 105 of a truss tube 104 reinforced by diagonal braces. For a straight flight path, the node bodies K1, K2 are arranged at a defined distance from one another. This distance is increased for the landing, with the nose-side node bodies K1 being displaced slightly forward within the adjustment region V1 so that the two nose-side aerofoils T1, T2 with a reduced angle of attack provide less lift than the two tail-side aerofoils T3, T4 with an increased angle of attack. For the landing, a landing gear 13 which can be folded out from the fuselage 10 and which has a main undercarriage 131 approximately in the middle of the aircraft and a support undercarriage 132 at the tail is provided. As shown at the bottom of FIG. 20, the two nose-side aerofoils T1, T2 can be displaced towards the tail 103 of the aircraft after the landing where they are vertically positioned and form a compact bundle in the end position so that the aircraft has a comparatively small space requirement after the landing. For the water landing of the aircraft, the fuselage 10 is designed as a central floating body 135 where, as shown in FIG. 22, two floating bodies connected to the node bodies K3, K4 support the aircraft after a water landing. The seaplane is propelled by a propeller engine with two propellers 111 arranged on the upper side of the fuselage. The seaplane has a wide application range from a passenger aircraft, a cargo aircraft or a fire-fighting aircraft to an unmanned aircraft 1 designed as a drone.

FIG. 21 shows the design of the aircraft according to FIG. 20, the fuselage 10 of which is designed as a truss tube 104 with a rectangular cross section. The truss tube 104 has four outer, longitudinally arranged cord bars 105, which are connected to one another on all sides by diagonal connections so that the fuselage 10 has a flexible rectangular usable space, which can end, for example, at the tail 103, with a flap that can be opened and used as a loading ramp. The skeleton construction of the aircraft 1 with a systematic separation of the supporting structure and shell makes it possible to design different types of aircraft on the basis of the foldable airframe.

FIG. 22 is a front view of the seaplane according to FIG. 20-21 after a water landing. The two nose-side aerofoils T1, T2 are hinged to the top of the fuselage 10 by means of the node bodies K1 while the tail-side aerofoils T3, T4 are connected to node bodies K2 and, together with the empennage 12, form a rigid unit. The nose-side aerofoils T1, T2 and the tail-side aerofoils T3, T4 are arranged at a vertical distance h from one another and are each connected at their outer ends to the node bodies K3, K4, which in turn are connected to floating bodies 135.

A wide variety of variations and modifications are, of course, possible within the scope of the invention.

The nose-side aerofoils T1, T2 are preferably parallel to the associated tail-side aerofoils T3, T4. Non-parallel embodiments are possible as well, however.

In the embodiments, four aerofoils T1 to T4 are provided in each case. Eight aerofoils or 12 aerofoils can be provided as well, for example.

| Overview of reference signs | | | |
|---|---|---|---|
| Aircraft | 1 | Folding system | 2 |
| Longitudinal axis | x | Aerofoils | T1-T4 |
| Transverse axis | y | Starboard-side and nose-sided aerofoil | T1 |
| Vertical axis | z | Port-side and nose-side aerofoil | T2 |
| Fuselage | 10 | Starboard-side and tail-side aerofoil | T3 |
| Adjustment region | V1, V2 | Port-side and tail-side aerofoil | T4 |
| Tube | 100 | Angle of attack | α |
| Rail | 101 | Sweep angle | φ, φ' |
| Nose | 102 | Vertical distance | h |
| Tail | 103 | Node bodies | K1-Kn |
| Truss tube | 104 | Nose-side, fuselage-side node bodies | K1 |
| Cord bars | 105 | Tail-side, fuselage-side node bodies | K2 |
| Engine | 11 | Starboard-side, outer knot body | K3 |
| Prop-fan engine | 110 | Port-side, outer node body | K4 |
| Propeller | 111 | Translation axis | β |
| Electric fan engine | 112 | Polygon ring | 20 |
| Empennage | 12 | Connection | 21 |
| Aileron | 120 | Revolute joint | 22 |
| Side rudder | 121 | Roller bearing | 220 |
| Elevon | 122 | Rotation axis | δ |
| Landing gear | 13 | Wing profile | 23 |
| Undercarriage | 130 | Wing nose | n |
| Main undercarriage | 131 | Wing trailing edge | e |
| Support undercarriage | 132 | Profile chord | p |
| Wheel | 133 | Slat | 24 |
| Car tire | 134 | Wing flap | 25 |
| Floating bodies | 135 | Telescopic wing | 26 |
| Drone | 14 | Aerofoil segment | 260 |

The invention claimed is:

1. An aircraft, comprising:
   at least one fuselage, an engine, an empennage, a landing gear, a longitudinal axis, a transverse axis and a vertical axis and a folding system;
   the folding system having aerofoils and node bodies which are connected to one another;
   the aerofoils having at least two nose-side aerofoils with a positive sweep angle and at least two tail-side aerofoils with a negative sweep angle in relation to the transverse axis, of which one of the nose-side aerofoils and one of the tail-side aerofoils are port-side aerofoils and one of the nose-side aerofoils and one of the tail-side aerofoils are starboard-side aerofoils, the node bodies having fuselage-side node bodies and outer node bodies;
   the nose-side aerofoils and the tail-side aerofoils each having a first end and a second end;
   the nose-side aerofoils and the tail-side aerofoils each being articulated at the first end to an associated fuselage-side node body by means of a revolute joint with a rotation axis, and the nose-side aerofoils and the tail-side aerofoils each being articulated at the second end to an outer node body by means of a revolute joint with a rotation axis, with a nose-side aerofoil and a tail-side aerofoil being connected to each other in each case via one of the outer node bodies,
   with the fuselage-side node bodies being displaceable at least partially along an associated translation axis,
   with, regarding the outer node bodies, the rotation axis being associated with the nose-side aerofoil not being provided parallel to the rotation axis associated the tail-side aerofoil in order to avoid a displacement of a fuselage-side node body along the associated translation axis to allow for a movement of the associated outer node body, with a movement component in a direction of the vertical axis and thus different operating positions of the folding system,
   and with
   the fuselage-side node bodies of the nose-side aerofoils, or
   the fuselage-side node bodies of the tail-side aerofoils, or
   both the fuselage-side node bodies of the nose-side aerofoils and the tail-side aerofoils being able to be moved independently of one another along the associated translation axis, and the folding system having a function of the empennage during flight; and
   the revolute joints each have only one degree of freedom, and the fuselage-side node bodies are connected to the fuselage at least in an unfolded operating position intended for a flight mode, with the folding system together with the fuselage forming a structure with a defined elastic deformability.

2. The aircraft according to claim 1, and further comprising a locking device for locking the fuselage-side node bodies relative to the fuselage in order to thereby lock the aerofoils in a predetermined operating position.

3. The aircraft according to claim 1, wherein the translation axis of the at least one fuselage-side node body runs parallel to the longitudinal axis.

4. The aircraft according to claim 1, wherein the aerofoils are twisted and, in a cross section parallel to the longitudinal axis, each have an asymmetrical wing profile with a suction side, with a pressure side and with a profile chord extending from a wing nose to a wing trailing edge.

5. The aircraft according to claim 4, wherein the wing noses each have adjustable slats, and wing trailing edges have adjustable wing flaps.

6. The aircraft according to claim 1, wherein one of the aerofoils has a telescopic wing which is made up of at least two aerofoil segments, the aerofoil segments being able to be pushed into one another in at least one predetermined operating position in such a way that a length of an aerofoil is reduced.

7. The aircraft according to claim 1, wherein the fuselage-side node bodies have nose-side and tail-side fuselage-side node bodies, the aerofoils having a nose-side, port-side aerofoil and a nose-side starboard-side aerofoil, a tail-side port-side aerofoil and a tail-side starboard-side aerofoil, and on which aircraft the nose-side port-side aerofoil and the nose-side starboard-side aerofoil are each connected to one of the nose-side fuselage-side node bodies, and the tail-side port-side aerofoil and the tail-side starboard-side aerofoil are each connected to one of the tail-side fuselage-side node bodies.

8. The aircraft according to claim 1, wherein the outer node bodies are each designed as winglets.

9. The aircraft according to claim 1, wherein first and second starboard-side aerofoils are arranged at a vertical distance with one another with respect to the vertical axis, and the first and second port-side aerofoils are arranged at a vertical distance from one another with respect to the vertical axis.

10. The aircraft according to claim 1, wherein at least one of the fuselage-side node bodies as a slide is connected to the fuselage via a rail.

11. The aircraft according to claim 1, wherein the fuselage-side node bodies have a fixed distance from one another with respect to the longitudinal axis in a basic position provided for a straight flight path, and profile chords of the aerofoils have a predetermined angle of attack.

12. The aircraft according to claim 1, wherein the aircraft is designed to fulfill the function of the empennage in that at least one fuselage-side node body of the port-side aerofoils and at least one fuselage-side node body of the starboard-side aerofoils are displaced on the associated translation axis in order to initiate a rotational movement of the aircraft about the transverse axis so that a distance between the fuselage-side node bodies is either decreased or increased and angles of attack of the two nose-side aerofoils change in opposite directions relative to the two tail-side aerofoils.

13. The aircraft according to claim 1, wherein the aircraft is designed to fulfill the function of the empennage in that, for initiation of a rotational movement of the aircraft about the longitudinal axis and about the vertical axis
   the fuselage-side node bodies associated with the nose-side aerofoils, or
   the fuselage-side node bodies associated with the tail-side aerofoils, or
   both the fuselage-side node bodies associated with to the nose-side aerofoils and the fuselage-side node bodies assigned to the tail-side aerofoils are displaceable independently of one another along the associated translation axes so that an angle of attack of the starboard-side aerofoils and the port-side aerofoils can be changed independently of one another to perform a turn.

14. The aircraft according to claim 1, wherein the revolute joint with the rotation axis between one of the node bodies and an aerofoil is designed as a multi-sectional connection.

15. The aircraft according to claim 1, wherein the fuselage is designed as a tube and forms a non-displaceable abutment for the displacement and for the locking of the fuselage-side node bodies in the respective operating position with the displacement and the locking of at least one of the fuselage-side node bodies taking place mechanically or hydraulically or pneumatically or by means of a pretensioned spring or as a combination of two or more of the systems mentioned.

16. The aircraft according to claim 1, wherein the aerofoils have a positive V-position and which is designed to
   initiate a descent by decreasing a distance between the fuselage-side node bodies of the nose-side aerofoils and the fuselage-side node bodies of the tail-side aerofoils,
   initiate a climb by increasing the distance between the fuselage-side node bodies of the nose-side aerofoils and the fuselage-side node bodies of the tail-side aerofoils, and to
   initiate a turn by moving the fuselage-side node bodies of the nose-side aerofoils or the fuselage-side node bodies of the tail-side aerofoils independently of one another.

17. The aircraft according to claim 1, wherein the aerofoils have a negative V-position and which is designed to
   initiate a climb by decreasing the distance between the fuselage-side node bodies of the nose-side aerofoils and the fuselage-side node bodies of the tail-side aerofoils,
   initiate a descent by increasing the distance between the fuselage-side node bodies of the nose-side aerofoils and the fuselage-side node bodies of the tail-side aerofoils, and to
   initiate a turn by moving the fuselage-side node bodies of the nose-side aerofoils or the fuselage-side node bodies of the tail-side aerofoils independently of one another.

18. The aircraft according to claim 1, wherein the aircraft is designed as a seaplane and in which the landing gear has floating bodies, the fuselage forming a central floating body and the outer node bodies being connected to supporting floating bodies with the aircraft being designed to allow for a negative V-position of the aerofoils.

19. An aircraft, comprising:
   at least one fuselage, an engine, an empennage, a landing gear, a longitudinal axis, a transverse axis and a vertical axis and a folding system;
   the folding system having aerofoils and node bodies which are connected to one another;
   the aerofoils having at least two nose-side aerofoils with a positive sweep angle and at least two tail-side aerofoils with a negative sweep angle in relation to the transverse axis, of which one of the nose-side aerofoils and one of the tail-side aerofoils are port-side aerofoils and one of the nose-side aerofoils and one of the tail-side aerofoils are starboard-side aerofoils, the node bodies having fuselage-side node bodies and outer node bodies;
   the nose-side aerofoils and the tail-side aerofoils each having a first end and a second end;
   the nose-side aerofoils and the tail-side aerofoils each being articulated at the first end to an associated fuselage-side node body by means of a revolute joint with a rotation axis, and the nose-side aerofoils and the tail-side aerofoils each being articulated at the second end to an outer node body by means of a revolute joint with a rotation axis, with a nose-side aerofoil and a tail-side aerofoil being connected to each other in each case via one of the outer node bodies,
   with the fuselage-side node bodies being displaceable at least partially along an associated translation axis,
   with, regarding the outer node bodies, the rotation axis being associated with the nose-side aerofoil not being provided parallel to the rotation axis associated the tail-side aerofoil in order to avoid a displacement of a fuselage-side node body along the associated translation axis to allow for a movement of the associated outer node body, with a movement component in a direction of the vertical axis and thus different operating positions of the folding system, and with
   the fuselage-side node bodies of the nose-side aerofoils, or
   the fuselage-side node bodies of the tail-side aerofoils, or
   both the fuselage-side node bodies of the nose-side aerofoils and the tail-side aerofoils being able to be moved independently of one another along the associated translation axis, and the folding system having a function of the empennage during flight; and
   a systematic separation of a support and shell function of the fuselage is provided with a wing unit being formed by a truss tube and a shell by a covering or by panels.

20. The aircraft according to claim 19, wherein the fuselage is designed as a polygonal truss tube with a rectangular cross-section, the truss tube having cord bars designed as longitudinal ribs with the cord bars forming a rail for the displacement of the fuselage-side node bodies.

21. An aircraft, comprising:
   at least one fuselage, an engine, an empennage, a landing gear, a longitudinal axis, a transverse axis and a vertical axis and a folding system;
   the folding system having aerofoils and node bodies which are connected to one another;
   the aerofoils having at least two nose-side aerofoils with a positive sweep angle and at least two tail-side aerofoils with a negative sweep angle in relation to the transverse axis, of which one of the nose-side aerofoils and one of the tail-side aerofoils are port-side aerofoils and one of the nose-side aerofoils and one of the tail-side aerofoils are starboard-side aerofoils, the node bodies having fuselage-side node bodies and outer node bodies;
   the nose-side aerofoils and the tail-side aerofoils each having a first end and a second end;
   the nose-side aerofoils and the tail-side aerofoils each being articulated at the first end to an associated fuselage-side node body by means of a revolute joint with a rotation axis, and the nose-side aerofoils and the tail-side aerofoils each being articulated at the second end to an outer node body by means of a revolute joint with a rotation axis, with a nose-side aerofoil and a tail-side aerofoil being connected to each other in each case via one of the outer node bodies,
   with the fuselage-side node bodies being displaceable at least partially along an associated translation axis,
   with, regarding the outer node bodies, the rotation axis being associated with the nose-side aerofoil not being provided parallel to the rotation axis associated the tail-side aerofoil in order to avoid a displacement of a fuselage-side node body along the associated translation axis to allow for a movement of the associated outer node body, with a movement component in a direction of the vertical axis and thus different operating positions of the folding system, and with
   the fuselage-side node bodies of the nose-side aerofoils, or
   the fuselage-side node bodies of the tail-side aerofoils, or
   both the fuselage-side node bodies of the nose-side aerofoils and the tail-side aerofoils being able to be moved independently of one another along the associated translation axis, and the folding system having a function of the empennage during flight; and the aircraft is designed as a supersonic aircraft, in which the tail-side aerofoils have adjustable wing flaps on wing trailing edges, in which the fuselage has a tube with an adjustable fuselage and with a raised tail, in which the fuselage-side node bodies of the tail-side aerofoils are rigidly connected to the fuselage, in which the fuselage-side node bodies of the nose-side aerofoils can each be displaced on an associated rail along a translation axis on an underside of the tube within an adjustment region in such a way that, in an operating position of the folding system intended for a subsonic flight, a distance between the node bodies is increased so much that a profile chord of an asymmetrical wing profile has an angle of attack on the two nose-side aerofoils, and the wing flaps on the two tail-side aerofoils are lowered so that all four aerofoils have curved suction sides with a pressure point in a front third for the subsonic flight and that, in an operating position of the folding system intended for a supersonic flight, the distance between the node bodies is selected so that the aerofoils assume a V-shaped position with respect to the vertical axis, and the aerofoils have a suction side with a pressure point that is shifted to a rear relative to the operating position intended for the subsonic flight.

* * * * *